United States Patent
Banerjee et al.

(10) Patent No.: US 10,694,466 B2
(45) Date of Patent: Jun. 23, 2020

(54) POWER OPTIMIZATION FOR A UNIT CELL METAMATERIAL ENERGY HARVESTER

(71) Applicant: University of South Carolina, Columbia, SC (US)

(72) Inventors: Sourav Banerjee, Irmo, SC (US); Riaz Ahmed, West Columbia, SC (US)

(73) Assignee: University of South Carolina, Columbia, SC (US)

( * ) Notice: Subject to any disclaimer, the term of this patent is extended or adjusted under 35 U.S.C. 154(b) by 573 days.

(21) Appl. No.: 15/627,817

(22) Filed: Jun. 20, 2017

(65) Prior Publication Data
US 2018/0368071 A1    Dec. 20, 2018

(51) Int. Cl.
*H01L 41/113* (2006.01)
*H04W 52/02* (2009.01)
(Continued)

(52) U.S. Cl.
CPC .......... *H04W 52/0261* (2013.01); *F03G 7/08* (2013.01); *H02K 7/18* (2013.01); *H02K 7/1892* (2013.01); *H02N 2/00* (2013.01); *H02N 11/002* (2013.01)

(58) Field of Classification Search
CPC ....... H04W 52/0261; F03G 7/08; H02K 7/18; H02K 7/1892; H02N 2/00; H02N 11/002
(Continued)

(56) References Cited

U.S. PATENT DOCUMENTS

| | | | |
|---|---|---|---|
| 3,230,402 A | 1/1966 | Nightingale et al. | |
| 3,456,134 A | 7/1969 | Ko | |

(Continued)

FOREIGN PATENT DOCUMENTS

| | | |
|---|---|---|
| CN | 101938224 | 1/2011 |
| CN | 2011185408 | 4/2011 |

(Continued)

OTHER PUBLICATIONS

Ahmed, Riaz U., and Sourav Banerjee. "Low frequency energy scavenging using sub-wave length scale acousto-elastic metamaterial." AIP Advances 4.11 (2014): 117114.

(Continued)

*Primary Examiner* — Thomas M Dougherty
(74) *Attorney, Agent, or Firm* — Dority & Manning, P.A.

(57) ABSTRACT

Modern living involves using a significant amount of energy, much of which may be wasted or not used efficiently. This apparatus and methodology focuses on potentially wasted energy that is being produced by ambient vibration. Bi-modal broad band energy and/or specific frequency harvester/scavengers utilize the physics of local resonance in acousto-elastic metamaterials (AEMM structures). Frequency selectivity of a harvester depends on the mass of a core resonator, soft material that houses the central mass/resonator, and the base material which is used to manufacture the metamaterial. Piezoelectric materials are known to produce electrical current when they are deformed mechanically. Ambient energy is available in the form of vibration and noise, e.g. car vibration, acoustic noise from heavy machineries, vibration from rails, which is lost, if not otherwise harvested. A smart metamaterial can scavenge/harvest ambient low frequency vibration for charging batteries such that the ambient energy may become a renewable source of energy to power low power electronic gadgets on the go. Power output for a unit cell AEMM embodiment is optimized through one or more of multi-frequency/multi-modal harvesting, geometric optimization, and PZT position optimization.

42 Claims, 15 Drawing Sheets

(51) Int. Cl.
  *F03G 7/08* (2006.01)
  *H02K 7/18* (2006.01)
  *H02N 11/00* (2006.01)
  *H02N 2/00* (2006.01)
(58) Field of Classification Search
  USPC .......................................................... 310/339
  See application file for complete search history.

(56) References Cited

U.S. PATENT DOCUMENTS

| | | | |
|---|---|---|---|
| 3,624,451 | A | 11/1971 | Gauld |
| 4,467,236 | A | 8/1984 | Kolm et al. |
| 4,920,563 | A | 4/1990 | Lemaire |
| 6,407,484 | B1 | 6/2002 | Oliver et al. |
| 6,653,762 | B2 | 11/2003 | Takeshima |
| 6,858,970 | B2 | 2/2005 | Malkin et al. |
| 6,954,025 | B2 | 10/2005 | Nishida et al. |
| 7,239,066 | B2 | 7/2007 | Ott et al. |
| 7,345,372 | B2 | 3/2008 | Roberts et al. |
| 7,345,407 | B2 | 3/2008 | Tanner |
| 7,557,456 | B2 | 7/2009 | Kornbluh et al. |
| 7,598,651 | B2 | 10/2009 | Kornbluh et al. |
| 7,598,652 | B2 | 10/2009 | Kornbluh et al. |
| 7,649,304 | B2 | 1/2010 | Umeda et al. |
| 7,667,375 | B2 | 2/2010 | Berkcan et al. |
| 8,080,920 | B2 | 12/2011 | Andosca et al. |
| 8,164,232 | B2 | 4/2012 | Kornbluh et al. |
| 8,207,907 | B2 | 6/2012 | Hyde et al. |
| 8,436,508 | B2 | 5/2013 | Kornbluh et al. |
| 2005/0206275 | A1 | 9/2005 | Radziemski et al. |
| 2005/0280334 | A1 | 12/2005 | Ott et al. |
| 2007/0145861 | A1 | 6/2007 | Tanner |
| 2008/0252174 | A1 | 10/2008 | Mohammadi et al. |
| 2009/0121585 | A1 | 5/2009 | Lee et al. |
| 2010/0072759 | A1 | 3/2010 | Andosca et al. |
| 2011/0109102 | A1 | 5/2011 | McCoy et al. |
| 2011/0210554 | A1 | 9/2011 | Boysel |
| 2016/0189702 | A1* | 6/2016 | Blanc ..................... G10K 11/04 367/137 |
| 2018/0166062 | A1* | 6/2018 | Hoffberg ................ G10K 11/18 |

FOREIGN PATENT DOCUMENTS

| | | |
|---|---|---|
| KR | 20100001159 | 1/2010 |
| KR | 20110017592 | 2/2011 |
| KR | 20120066911 | 6/2012 |
| KR | 20130011471 | 1/2013 |
| WO | WO 2005/089176 | 3/2004 |
| WO | WO 2010/151738 | 12/2010 |

OTHER PUBLICATIONS

Ahmed, Riaz U., Afifa Adiba, and Sourav Banerjee. "Energy scavenging from acousto-elastic metamaterial using local resonance phenomenon." SPIE smart structures and materials+ Nondestructive evaluation and health monitoring. International Society for Optics and Photonics, 2015.

Ahmed, Riaz, Dylan Madisetti, and Sourav Banerjee. "A sub-wavelength scale acoustoelastic sonic crystal for harvesting energies at very low frequencies (<~ 1 kHz) using controlled geometric configurations." Journal of Intelligent Material Systems and Structures (2016): 1045389X16645863.

Anton, et al. "A review of power harvesting using piezoelectric materials (2003-2006)" *Smart Materials and Structures* 16(3) (2007) pp. R1-R21.

Badel, et al. "Single Crystals and Nonlinear Process for Outstanding Vibration-Powered Electrical Generators" *IEEE Transactions on Ultrasonics, Ferroelectrics, and Frequency Control* 53(4) (2006) pp. 673-684.

Banerjee, S. "Electromechanical Model for a plate type energy harvester using coupled strain rate damping mechanism" *JP Journal of Solids and Structures* 5(2) (2011) pp. 75-105.

Beeby, et al. "Energy harvesting vibration sources for microsystems applications" *Measurement Science and Technology* 17(12) (2006) pp. R175-R195.

Carrara, et al. "Dramatic enhancement of structure-borne wave energy harvesting using an elliptical acoustic mirror" *Applied Physics Letters* 100:204105 (2012) pp. 1-4.

Chen, et al. "Metamaterials-based enhanced energy harvesting: A review" *Physica B* 438 (2014) pp. 1-8.

Choi, et al. "Energy harvesting MEMS device based on thin film piezoelectric Cantilevers" *Journal of Electroceramics* 17(2-4) (2006) pp. 543-548.

Cook-Chennault, et al. "Powering MEMS portable devices—a review of non-regenerative and regenerative power supply systems with special emphasis on piezoelectric energy harvesting systems" *Smart Materials and Structures* 17(4):043001 (2008) pp. 1-33.

Cunefare, et al. "Energy harvesting from hydraulic pressure fluctuations" *Smart Materials and Structures* 22(2):025036 (2013) pp. 1-10.

Erturk, et al. "An experimentally validated bimorph cantilever model for piezoelectric energy harvesting from base excitations" *Smart Materials and Structures* 18(2):025009 (2009) pp. 1-18.

Huang, et al. "On the negative effective mass density in acoustic metamaterials" *International Journal of Engineering Science* 47(4) (2009) pp. 610-617.

Liu, et al. "Multi-displacement microstructure continuum modeling of anisotropic Elastic" *Wave Motion* 49(3) (2012) pp. 411-426.

Liu, et al. "Active Piezoelectric Energy Harvesting: General Principle and Experimental Demonstration" *Journal of Intelligent Material Systems and Structures* 20 (2009) pp. 575-585.

Liu, et al. "Analytic model of phononic crystals with local resonances" *Physical Review B* 71(1):014103 (2005) pp. 1-8.

Liu, et al. "Locally Resonant Sonic Materials" *Science* 289 (2000) pp. 1734-1736.

Lv, et al. "Vibration energy harvesting using a phononic crystal with point defect states" *Applied Physics Letters* 102(3):034103 (2013) pp. 1-3.

Priya, S. "Advances in energy harvesting using low profile piezoelectric transducers" *Journal of Electroceramics* 19(1) (2007) pp. 167-184.

Shen, et al. "The design, fabrication and evaluation of a MEMS PZT cantilever with an integrated Si proof mass for vibration energy harvesting" *Journal of Micromechanics and Microengineering* 18(5):055017 (2008).

Sheng, et al. "Locally resonant sonic materials" *Physica B: Condensed Matter* 338(1-4) (2003) pp. 201-205.

Tan, et al. "Optimizing the band gap of effective mass negativity in acoustic metamaterials" *Applied Physics Letters* 101(24):241902 (2012).

Wang, et al. "Vibration energy harvesting device based on air-spaced piezoelectric cantilevers" *Applied Physics Letters* 90(26):263512 (2007).

Wu, et al. "Acoustic energy harvesting using resonant cavity of a sonic crystal" *Applied Physics Letters* 95(1):013506 (2009).

Wu, et al. "Acoustic pressure in cavity of variously sized two-dimensional sonic crystals with various filling fractions" *Physics Letters A* 373(12-13) (2009) pp. 1189-1195.

Wu, et al. "Experimental investigation of the acoustic pressure in cavity of a two-dimensional sonic crystal" *Physica B: Condensed Matter* 404(12-13) (2009) pp. 1766-1770.

* cited by examiner

| Mode | Vibration Pattern | Piezoelectric Material Orientation |
|---|---|---|
| P | Core resonator is vibrating along thickness direction of the unit cell. | In between resonator and free surface of the matrix material, keeping piezoelectric material and AEMM thickness axis aligned. |
| Q | Core resonator is vibrating along width direction of the unit cell. | In between resonator and cavity wall, keeping piezoelectric material and AEMM thickness axis perpendicular. |
| R | Core resonator is rotating about the width axis of the structure. | In between resonator and cavity wall, keeping piezoelectric material and AEMM thickness axis parallel. |
| S | Core resonator is rotating about the thickness axis of the structure. | In between resonator and cavity wall, keeping piezoelectric material thickness axis perpendicular to the AEMM thickness axis. |

FIGURE 9

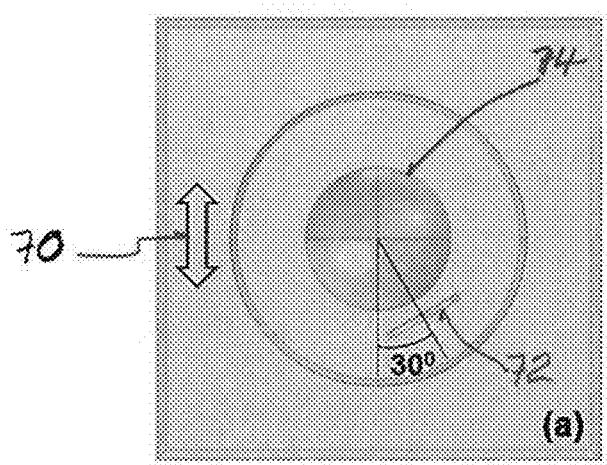

FIGURE 10A

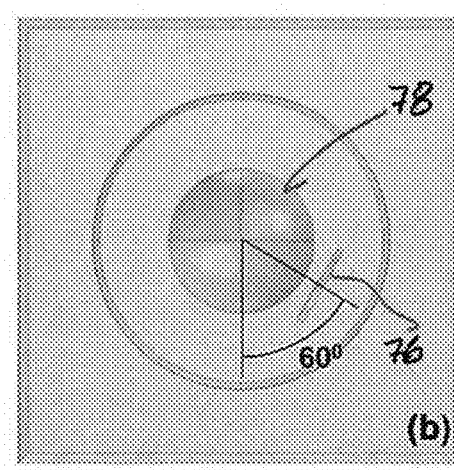

FIGURE 10B

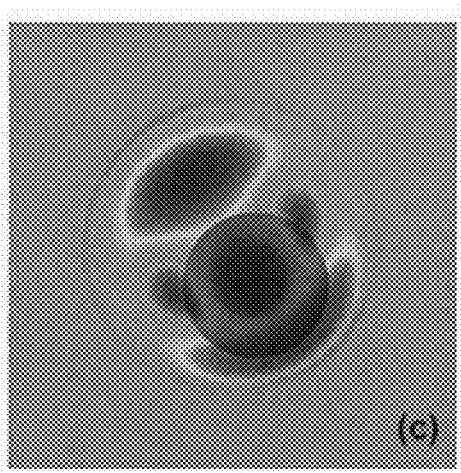

FIGURE 10C

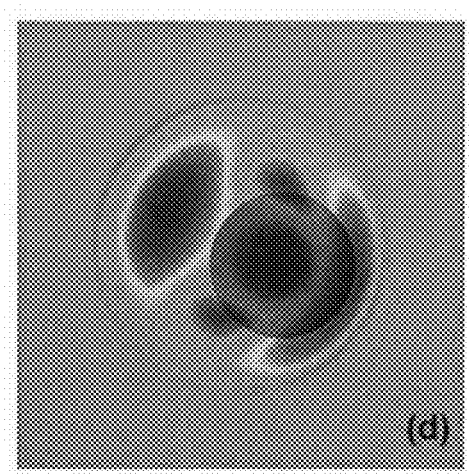

FIGURE 10D

| Cell # | Diameter (mm) | Energy harvestable frequency (Hz) |
|---|---|---|
| 134 | 28 | ~ 8 |
| 142 | 24 | ~ 12 |
| 138 | 20 | ~ 20 |
| 140 | 16 | ~ 34 |
| 136 | 12 | ~ 82 |
| 144 | 8 | ~ 210 |
FIGURE 18
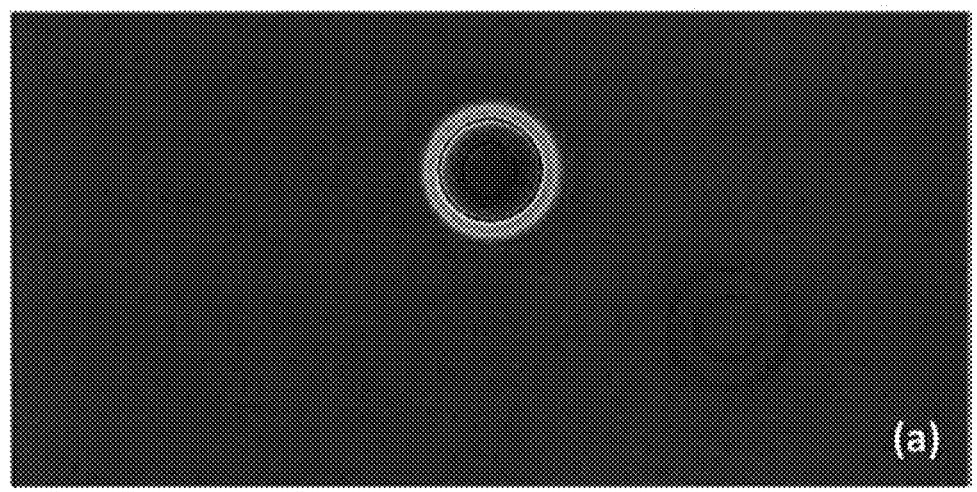
FIGURE 19A
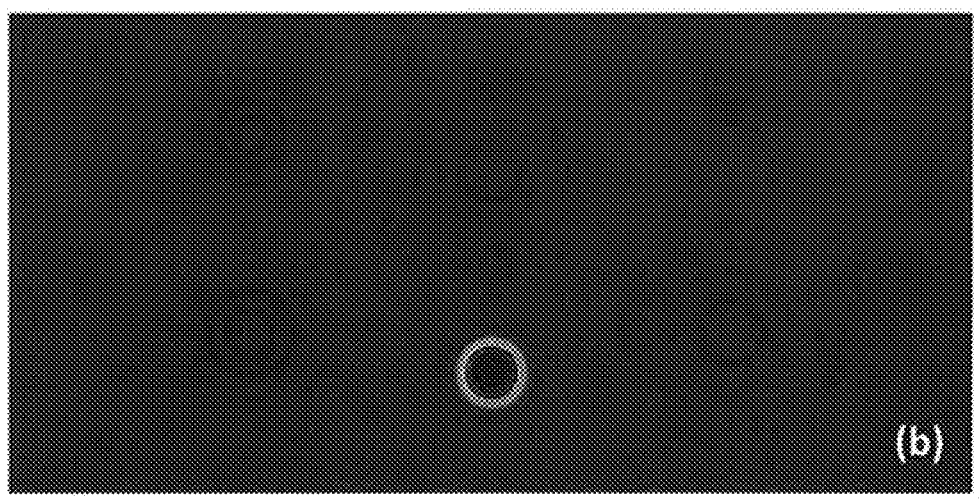
FIGURE 19B

POWER OPTIMIZATION FOR A UNIT CELL METAMATERIAL ENERGY HARVESTER

STATEMENT REGARDING FEDERALLY SPONSORED RESEARCH OR DEVELOPMENT

The presently disclosed subject matter was made without government support.

BACKGROUND OF THE PRESENTLY DISCLOSED SUBJECT MATTER

The presently disclosed subject matter generally relates to energy efficiency, and more particularly to optimized harvesting of energy from relatively low frequency sources, for other effective uses. In some instances, harvested energy may be obtained in optimized fashion from ambient sound sources in sufficient amounts for use to power circuits or to be stored for subsequent use.

In the present-day digital economy, recent advancements in low power electronics, micro-electromechanical systems, wireless sensors, and electronic gadgets have significantly increased daily power demands. Increased use of cell phones, tablets, and other devices such as iPods or iPads throughout the world has resulted in a surprisingly high energy footprint, with one recent report claiming that household energy demand has increased by 3.4% since 1990. Based on calculations just for use in the United States, smart phone usage is estimated to demand 1,269,000 Wh of energy per year (International Energy Agency). It is considered that power demands could be significantly alleviated if much of such demands of power can be satisfied by local powering devices, such as harvesting energy from abundant ambient noises, a renewable form of energy. Accordingly, different local energy harvesters have been proposed using multiple micro-cantilevers to scavenge energies from various alternate sources.

Some energy harvesters utilize the ability of piezoelectric materials to generate electric potential in response to external mechanical deformations. Some efforts have sought to achieve in essence self-powered wireless electronics such that maintenance, replacement of old batteries, and chemical waste from conventional batteries could be avoided. Various low power energy harvesters have been provided for such purposes. Micro-cantilever energy harvesters are one known form of low power energy harvesters with power outputs in the range of microwatts.

More recently, plate-type energy harvesters for high-frequency applications have been proposed. Conventional energy harvesters, using the physics of structural resonance to harvest dynamic energy, require dimensions or a footprint to be on the order of few times higher than the wavelength of the excitation frequencies. Therefore, miniature cantilever energy harvesters have been often designed for high-frequency applications.

Due to size limitations at lower frequencies, fewer solutions have sought use of the physics of phononic crystals (PCs). PCs offer the ability to introduce novel wave traveling and wave filtering phenomena within the structure and its structural constituents. PCs can create frequency band gaps through Bragg scattering or through local resonances. Such band gaps are frequency intervals in which the elastic waves are incapable of propagating through the material due to the interference of the waves, caused by the impedance mismatch in the periodic geometry or the material discontinuities. At such band gaps or at the band of resonance frequencies, the filtered wave energy gets localized in the structure which could be further utilized to harvest energy from the PCs. Accordingly, some approaches have introduced PCs for harvesting energy.

One researcher has proposed a method of guiding waves through an acoustic funnel to a metamaterial energy harvester that uses a parabolic acoustic mirror. Hexagonally oriented PCs with piezoelectric-coated cantilever beams at each joint have been proposed for a grid energy harvester, though such approaches were proposed to harvest energies from relatively higher frequencies, such as above about 50 kHz.

Concerning possibilities more focused on harvesting energies at relatively lower acoustic frequencies (for example, of about less than 1 kHz), the physics have been significantly altered, such as introducing a cavity in the PC to localize the acoustic energy at the resonance frequencies while the energy was harvested using polyvinylidene fluoride (PVDF) film. Power output from such low-frequency PC-based energy harvesters has been quite low (in the range of nanowatts (nW) or a few microwatts (mW) against 10 KOhm load resistance.

One researcher has reported a model that could harvest considerably higher electric potential using a one-dimensional (1D) phononic piezoelectric cantilever beam. Instead of arresting the local resonance phenomenon, Bragg scattering physics was employed to harvest energy. While efficient energy harvesting was achieved, the model length could be too large (1 m long) to power small electronic devices if the energy has to be harvested below about 1 kHz. Also, such small-scale harvesters based on the physics of PCs were limited to harvesting energy only at a single frequency.

Since acoustoelastic sonic crystal (AESC) devices possess similar phenomena like PCs (though using different physics) and are capable of introducing local resonance modes, an AESC could be a better choice over PC harvesters for some circumstances. AESCs can be considered as a spring-mass combination in a mass-in-mass system. Per some prior work, an AESC can be provided as a composite material composed of soft and stiff components.

One prior approach has used an AESC structural unit consisting of a square mass connected to a square frame by four convolute folded beams. Upon unit excitation, a maximum of 0.005 V (approximately, power output in nW range against reference load resistance) could be harvested, which is a relatively low amount.

Also previously, an acoustoelastic metamaterial-based energy harvester has been proposed which is capable of harvesting energy at relatively low acoustic frequencies (about 3 kHz) using sub-wavelength scale geometry. Such harvester demonstrated the ability to harvest energy at a specific frequency from a unit-cell model. However, possibilities to scavenge energy at other frequencies within the low frequency limit were not specified.

Another prior approach has sought to advance AESC energy harvester which is able to simultaneously addresses five principal targets:

1. Harvest energy below about 1 kHz, that is, at Hz level;
2. Predictively control model geometry;
3. Harvest energy at multiple frequencies;
4. Show ability to harvest energy by both displacement and acoustic pressure excitation; and
5. Output higher power density close to 100 mW/cm$^2$.

AESCs may be used to stop acoustic wave propagation at a particular frequency. Using a mass-in-mass system, low-frequency stop band filters are designed to filter wave energy at local resonance frequencies trapped inside a soft constituent of the sonic crystal as dynamic strain energy. It is possible to recover the same energy using embedded piezoelectric wafers (lead zirconate titanate, "PZT"). Prior art FIG. 1 represents the use of an AESC energy scavenger generally 10 exposed to an ambient vibration acoustic noise environment generally 12, which contains broadband frequencies. In AESC 10, the soft material is used as a host matrix to house the heavier mass. Power is harvested when the local resonance of the embedded mass strains the soft composite matrix which is recovered by the embedded piezoelectric wafers such as representative wafer 14.

Local resonance is key to wave filtration (as generally represented at 16) for creation of a band stop for certain frequencies, and for harvesting energy from the AESC model (as generally represented at 18). Dispersion curve and density of states (DOS) of the unit-cell AESC are calculated to find the possible local resonance modes less than 1 kHz frequency. Strategic PZT placement and loading conditions further the scavenging of power at those local resonance frequencies. With such an arrangement, it is possible to localize the energy at multiple low frequencies, to be harvested through appropriate PZT design and placement.

For testing both the controlled displacement and the pressure wave excitation, the exemplary device may be vibrated harmonically using a shacking base for displacement excitation, while the structures may be excited using acoustic pressure or noise to test a pressure wave mechanism. Such testing confirmed capability of the AESC structure to perform simultaneous wave filtration and energy harvesting.

FIG. 2A illustrates a prior art three-dimensional unit-cell acoustic metamaterial comprising a rectangular 1.43"×1.43"×0.55" (3.65 cm×3.65 cm×1.4 cm) prism generally 20. Such prism 20 as illustrated comprises rectangular aluminum frame 22 housing a cylindrical soft rubber (matrix) material 24. A spherical heavy lead core 26 is encapsulated into the matrix material 24, where diameters of the core 26 and the matrix are 0.49" (12.5 mm) and 0.98" (25 mm), respectively. Stiffness (Young's modulus) for aluminum, lead, and rubber are 68.9 GPa, 13.5 GPa, and 0.98 MPa, respectively.

Piezoelectric disc generally 28 is embedded into the matrix material 24, in between lead core 26 and inner aluminum wall 22, to convert strain energy into electric potential at local resonance.

The unit-cell model of the metamaterial generally 20 could be exhibited as conventional one-dimensional spring-mass system, as represented in prior art FIG. 2B. For calculation purposes, one may assume that displacement of the masses follow the time-harmonic wave behavior, similar to that of the applied force, i.e., $F(t)=Re(\hat{F}e^{-i\omega t})$. Acknowledging the equation of motion and balancing the linear momentum of the system, dynamic effective mass of the microstructure is shown by Equation 1, herein, as below:

$$M_{eff} = M_0 + \frac{2Km_1}{2K - m_1\omega^2} + \frac{2Km_2}{2K - m_2\omega^2} \quad \text{(Equation 1)}$$

where $M_0$, $m_1$ and $m_2$ are the masses of aluminum frame 22, lead core 26, and PZT 28, respectively. K represents the spring constant for the rubber component.

Assuming thickness-polarized piezoelectric state and ignoring effects from other directions, the piezoelectric charge density displacement is given by Equation 2 herein, as below:

$$D_3 = d_{33}T_3 + \varepsilon_{33}E_3 \quad \text{(Equation 2)}$$

where $T_3$ is the total compressive stress acted on PZT. $\varepsilon_{33}$ (=1500*8.854 pF/m), $d_{33}$ (=593 pm/V) and $E_3$ are the permittivity, piezoelectric charge constant and electric field strength, respectively, in the thickness direction.

Following assumptions, dynamic output potential and Frequency Response Function (FRF) are obtained per Equations 3-7, as follows:

$$V_0(\omega) = \frac{i\omega C_1 R_0 U_0}{1 - i\omega C_2 R_0} \quad \text{(Equation 3)}$$

$$FRF = \left|\frac{V_0}{\omega^2}\right| \quad \text{(Equation 4)}$$

$$C_1 = -\frac{2d_{33}M_e}{r} \quad \text{(Equation 5)}$$

$$C_2 = -\frac{2\pi r\varepsilon_{33}}{h} \quad \text{(Equation 6)}$$

$$M_e = 2 - \frac{2K}{2K - m_1\omega^2} + \frac{2K}{2K - m_2\omega^2} \quad \text{(Equation 7)}$$

where r and h are the thickness and radius of the piezoelectric material. $U_0$ represents the excitation amplitude and $R_0$=10 KΩ is the resistive load.

FIG. 3 shows the analytically measured effective mass of such exemplary prior art embodiment as a function of wave frequency. Dynamic effective mass of the system is found negative at 0.42 KHz and 3.3 KHz. The effective mass becomes negative close to the local resonance frequency of the interior masses, which implies that wave energy is trapped inside and cannot be transmitted through the structure. Consequently, the embedded PZT generally 28 is stressed and maximum FRF is noticed at local resonance frequencies as depicted in prior art FIG. 3. Two FRF picks are observed, with the first pick resulting from the local resonance of the core mass and with the second pick due to the PZT resonance.

Analytically, numerically and experimentally obtained dynamic FRF for a resistive load of 10 KΩ are shown with FIG. 3, with analytically computed dynamic effective mass plotted at the bottom of such illustration. Therefore, prior art FIG. 3 confirms that the experimental approach underpins the analytical and numerical approaches as well with maximum potential at 0.37 KHz and 3.1 KHz. Because of instrumentation lapse and fabrication limitations, little shift of FRF picks is noticed in experimental studies. It was found that with such acousto-elastic metamaterial embodiment generally 20, up to 35 µW power was produced for a resistive load of 10 KΩ, which is significantly higher than the power generated (in nW range) by the above-referenced phononic crystal based energy harvesters.

Prior art FIG. 4 illustrates the harmonic excitation directions of a representative unit cell generally 30 to introduce different local resonance modes (P, Q, R, and S, respectively). Thus, FIG. 4 represents acquiring the local resonance modes with external loading (i.e., FIG. 4 represents the eigen modes of the unit cell 30). Different loading conditions are considered to actuate the different local resonance modes. Boundary displacement excitations are considered to acquire corresponding local resonance modes. Specifically, excitation along the Z- and X-axes result in designated P and Q modes, respectively. Harmonic rotation about Y- and Z-axes result in designated R and S modes, respectively.

Prior art FIG. 5 represents placement of piezoelectric wafers inside the soft core of the representative AESC 30 (see FIG. 4) for multi-modal harvesting below 1 kHz. The top row of the illustration shows plan views for modes P (32), Q (34), R(36), and S(38), respectively, while the bottom row shows the side views thereof.

Each resonance mode arrests the dynamic wave energy inside the matrix-resonator in unique ways inside the cell 30. Appropriate placement of an energy conversion material with proper design inside a matrix component capable of mechanoelectrical transduction (e.g. a piezoelectric material) can provide significant electric potential at the local resonance frequencies. Prior art FIG. 6 represents PZT placement of unit cell 30 to harvest energy from mode Q.

Considering such Q mode at about 415 Hz, since the center mass 26 resonates along the longitudinal direction of the cell 30, placing a piezoelectric disk in between the center mass 26 and aluminum frame 22 effectively harvests electrical potential. Piezoelectric wafer disk 28 is placed such that its thickness axis lies concurrent to the center line axis of the core mass 26, as illustrated in FIG. 6. Similar basic physics may be used to place other wafers for other modes as shown in FIG. 5.

Specific examples of harvesting the energy from the mode Q using the displacement excitation direction of the unit-cell AESC 30 is shown in the following article, which is fully incorporated herein by reference and for all purposes: "A Sub-Wavelength Scale Acoustoelastic Sonic Crystal for Harvesting Energies at very Low Frequencies (<~1 KHz) using Controlled Geometric Configurations" published in the Journal of Intelligent Material Systems and Structures, Special Issue Article, DOI: 10.1177/1045389X16645863, Ahmed, R., Madisetti, D., Banerjee, S., (2016).

See also the following additional articles, which are fully incorporated herein by reference and for all purposes:
"Low Frequency Energy scavenging using sub-wave length scale acousto-elastic metamaterial", AIP Advances, Vol. 4 (11), 10.1063/1.4901915, Ahmed, R., Banerjee, S., (2014); and
"Energy scavenging from acoustoelastic metamaterial using local resonance phenomenon", Proc. SPIE 9431, Active and Passive Smart Structures and Integrated Systems 2015, 943106 (Apr. 2, 2015); doi:10.1117/12.2084773, Ahmed, R., Adiba, A., Banerjee, S., (2015).

In general, the AESC generally 30 consists of a relatively stiff frame 22 and a relatively heavy core 26 encapsulated into a soft matrix material 24. The piezoelectric material 28 is embedded into the matrix material 24 to convert the strain energy to electric potential. To convert the trapped strain energy into electrical potential at the selected mode Q, a piezoelectric wafer 28 ($\phi$=about 7 mm, thickness=about 0.5 mm, mass=about 0.16 g) is embedded inside the matrix 24 in between the lead core 26 and the cavity wall 22 (FIG. 6) at a specific distance "h" from the core mass 26, which was found to be approximately H/4 to maximize the energy density, where "H" is the distance between core mass 26 and cavity wall 22. In the numerical study, a unit displacement of 1 mm is applied as the excitation input to evaluate the dynamic response of the AESC generally. For displacement excitation, the whole structure would need to be installed on a vibratory base. Displacement excitation technique was used for experimental validation and simplicity.

The AESC generally 30 was fabricated by placing the piezoelectric wafer 28 for the Q mode design as shown in FIG. 6. Machined aluminum 6061 was used as the boundary structure 22 with a cylindrical hole to place rubber 24 and lead 26 components. The diameter of lead ball 26 was slightly lower than the thickness of aluminum block 22. To place ball 26 at the middle (concerning all three dimensions) of the aluminum hole, a cylindrical support is designed and fabricated through 3D printing technology. The cylindrical support (not separately illustrated) consisted of three parts (insider, base, and handle) with the diameter of the insider portion as exactly the same as the diameter of the aluminum hole. A small arc indentation was used at the middle of the insider, to hold lead ball 26 at the middle. The insider was inside of the aluminum hole and its dimensions were set to support the lead core 26 at the middle of the structure with high precision. Diameter of the base is slightly higher than the width of the aluminum block 22, so that it carries the whole structure.

The fabrication process was divided into two steps. First, lead core 26 was placed inside the middle of aluminum block 22 using the cylindrical support. A liquid rubber (OOMOO 300, containing two parts, mixed slowly to avoid bubbles and to provide homogeneous strength) was used to fill the hole in aluminum block 22. Since it was necessary to sense/transfer signal from the rubber component, a piezoelectric disk 28 (with soldered wire) was fully submerged into the liquid rubber in such a way that it remained untouched with both lead ball 26 and aluminum structure 22. Usual rubber curing time was 6 hours. However, it is required to start the second step of fabrication at around 3 to 4 hours after the first step.

During the initial steps, cylindrical support was used to hold lead ball 26 at the middle. Hence, an empty space was open at the bottom of the structure after removing the cylindrical support. In the second step, such new empty space was filled with rubber following the same procedure described above. Since it is required to have a good bonding between the rubber, the second step was started before the full curing time in the first step.

FIG. 7A is a schematic diagram of the arrangement for measuring results with a unit cell metamaterial AESC embodiment 30 as referenced above, while FIG. 7B pictures equipment for the experimental arrangement, as shown schematically in FIG. 7A.

The Vibration Exciter generally 40 is a type 4809 from B & K Instruments, and was employed for managing harmonic displacement excitation. A sine-random Generator (type 1024) generally 42 and Power Amplifier (type 2706) generally 44 from Bruel & Kjaer were used to control excitation frequency. Voltage output generally 46 and 48 from wafer 28 was captured across a 10 KOhm resistive load generally 50, using oscilloscope 52. A support structure generally 54 was devised as represented to hold unit cell 30 for excitation by exciter equipment 40. Per the 2016 Ahmed et al. publication noted above, upon a unit displacement of 1 mm excitation, maximum power density of 92.4 mW/cm$^2$ was recorded from the experimental results with such set-up. The set-up showed that energy could be harvested at four different frequencies using the AESC embodiment 30, with higher amounts of power generated over other existing harvesters. The set-up also showed that the local resonance frequencies of the AESC system of embodiment 30 were independent of their structural geometry, and that the AESC embodiment 30 is capable of simultaneously filtering acoustic waves and harvesting energy.

However, the presently disclosed subject matter addresses different loading conditions separately. More particularly, the presently disclosed subject matter addresses loading condition(s) to actuate all four available local resonance modes, or a particular environmental loading condition that could trigger all the possible modes of vibration, in equivalence, to harvest multi-modal energy with higher power density. Thus, while it has been shown that, four local resonance modes exist within a 1 kHz frequency level, the presently disclosed subject matter seeks to maximize potential power output of such arrangements. In other words, the presently disclosed subject matter seeks to optimize power for a unit cell metamaterial energy harvester.

SUMMARY OF THE PRESENTLY DISCLOSED SUBJECT MATTER

In general, it is a present object to provide improved energy efficient arrangements, and associated methodology. It is a more particular object, in some instances, to provide an improved harvesting of potentially wasted energy that is being produced by ambient vibration, for other effective uses. In some instances, harvested energy may be used to power circuits, for example, for charging or for powering an electrical load.

It is also a present object to provide for obtaining power output for a unit cell or AEMM structure which is optimized through one or more of multi-frequency/multi-modal harvesting, geometric optimization, and PZT position optimization.

One presently disclosed exemplary embodiment of the presently disclosed subject matter relates to an energy harvesting apparatus. Such apparatus preferably may comprise an energy harvesting apparatus for harvesting of energy from ambient sound sources in a given environment, so that such apparatus may be capable of providing electrical energy to a load. More preferably, such apparatus comprises an acousto-elastic metamaterial unit cell having a matrix which receives a core mass resonator for movement in such unit cell in response to ambient sound in the environment of such unit cell; and at least one piezoelectric member embedded in such unit cell, for outputting electrical energy in response to strain created in such unit cell by movement of such resonator in such unit cell. Further, such apparatus is preferably tuned for harvesting energy in at least two modes, for optimization of electrical energy generation.

For some such apparatus, such at least two modes may comprise at least two respective local resonance modes of such unit cell. For others, such at least two modes may comprise at least two piezoelectric wafers respectively embedded in such unit cell, for respectively outputting electrical energy in response to strain created by movement of such resonator in such unit cell. In some of such apparatus with wafers, such wafers may be embedded in such unit cell in predetermined locations based on the desired axes of vibration for harvesting energy from such unit cell.

In other variations of some of the foregoing, such piezoelectric member may comprise at least one lead zirconate titanate ("PZT") wafer. For yet others, such unit cell may further include a relatively stiff frame enclosing such unit cell matrix; such unit cell matrix may be relatively soft; and such unit cell core mass resonator may be relatively heavy. For some such variations, such unit cell frame may comprise aluminum, such unit cell matrix may comprise rubber, and such unit cell core mass resonator may comprise lead.

In yet other presently disclosed alternatives, such unit cell matrix may comprise a flexible membrane; and such piezoelectric member may comprise a piezoelectric polymer. For others thereof, such unit cell matrix may comprise a relatively thin section of silicon; such unit cell core mass resonator may comprise steel; and such piezoelectric polymer may comprise polyvinylidene fluoride (PVDF).

In some of the foregoing variations, such flexible membrane may be attached to a surface of an associated electronic device; and such piezoelectric member electrical energy output may be configured for at least one of powering and charging such electronic device.

For yet some, such associated electronic device may comprise an implantable medical device. For some of those, such implantable medical device may comprise a pacemaker; and such apparatus may be tuned for having at least one local resonance mode of such unit cell resulting in an energy harvestable frequency of about 39 Hz.

In still other variations of presently disclosed exemplary embodiments, such flexible membrane may be attached to a plate of a mobile associated electronic device. Some of such variations may further include a plurality of such acousto-elastic metamaterial unit cells, each respectively having a matrix which receives a core mass resonator for movement in each of such unit cells in response to ambient sound in the environment of such unit cells; and with at least one piezoelectric member embedded in each of such unit cells, for outputting electrical energy in response to strain created in such unit cells by movement of such resonators in such unit cells; and wherein such piezoelectric members having respective electrical energy outputs may be configured for at least one of powering and charging such mobile associated electronic device. Per some such variations, such plurality of such acousto-elastic metamaterial unit cells may comprise generally circular unit cells having respective diameters in a range in respective increments.

For yet other alternatives, such apparatus may be tuned for harvesting energy from relatively low frequency ambient sound sources. Per others, such at least two modes may comprise at least three respective piezoelectric wafers respectively embedded at different locations in such unit cell, for respectively outputting electrical energy in response to strains created by vibrations relative respectively to the x-, y- and z-directions of such resonator in such unit cell. For others, such unit cell may further include a relatively stiff frame having a cavity wall enclosing such unit cell matrix; such at least one piezoelectric member may comprise a piezoelectric wafer selectively embedded in a selected mode Q in such unit cell, for outputting electrical energy in response to strain created in such unit cell by movement of such resonator in such unit cell; and the distance between the outside diameter of such core mass resonator and such cavity wall may be about 3.5 times the distance of the wafer from the outside diameter of such core mass resonator. For still other alternatives, such unit cell may further include a relatively stiff frame enclosing such unit cell matrix; such apparatus may further include a plurality of such acousto-elastic metamaterial unit cells, having at least one piezoelectric member embedded in each of such unit cells, for outputting electrical energy in response to strain created in such unit cells by movement of such resonators in such unit cells; and such plurality of unit cells may be collectively arranged in a sound barrier for reducing ambient noise from ambient sound sources in a given environment while also collectively electrically connected for outputting electrical energy from such barrier for being stored in an energy storage mechanism or concurrently used as harvested energy output from such barrier.

It is to be understood that the presently disclosed subject matter equally relates to associated and/or corresponding methodologies. One exemplary such method relates to methodology for harvesting of energy from ambient sound sources in a given environment, for providing electrical energy to a load. Such methodology preferably comprises providing an acousto-elastic metamaterial unit cell having a matrix which receives a core mass resonator for movement in such unit cell in response to ambient sound in the environment of such unit cell; embedding at least one piezoelectric member in such unit cell, for outputting electrical energy in response to strain created in such unit cell by movement of such resonator in such unit cell; and tuning the unit cell and piezoelectric member for harvesting energy in at least two modes, for optimization of electrical energy generation. Other variations of methodology may be practiced as noted above in conjunction with variations and alternatives of corresponding apparatus.

Yet another exemplary embodiment of presently disclosed methodology relates to methodology for harvesting of electric potential from ambient low frequency vibrations having multiple acoustic low frequencies, using a smart unit cell metamaterial, for providing electrical energy to an electrical load. Such methodology preferably comprises providing an energy harvesting unit comprising an acousto-elastic metamaterial unit cell having a matrix which receives a core mass resonator for movement in such unit cell in response to ambient sound in the environment of such unit cell, and having at least one embedded piezoelectric member in such unit cell, for outputting electrical energy in response to strain created in such unit cell by movement of such resonator in such unit cell; providing a plurality of such energy harvesting units together in an environment having ambient low frequency vibrations; and electrically connecting such plurality of energy harvesting units, for providing electrical energy therefrom for one of charging or driving a load.

Some variations of the foregoing methodology, may further include providing each of such energy harvesting units with respective frames surrounding their respective matrices; and supporting such plurality of such energy harvesting units in a barrier wall so that such wall functions both for noise control and energy harvesting.

Yet other variations of the foregoing may further include providing each of such energy harvesting units with planar cell structures; and supporting such plurality of such energy harvesting units on a plate of an associated electronic device so that such plurality of energy harvesting units provide electrical energy therefrom for one of charging or driving such associated electronic device.

Still in some instances, for other alternatives of the foregoing, at least some of such plurality of such energy harvesting units include respective, different structures or materials designed for having different energy harvestable frequencies from at least one other of such energy harvesting units having different structures or materials therefrom.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, to one of ordinary skill in the art, is set forth more particularly including the specification, and including reference to the accompanying figures in which:

FIG. 9 illustrates in table form presently disclosed subject matter for harvesting energy at modes P, R and S, including description of orientation of the piezoelectric material, for various exemplary embodiments in accordance with the presently disclosed subject matter;

FIG. 10A represents a presently disclosed exemplary embodiment with PZT rotation about the thickness axis of the unit cell at 30 degrees;

FIG. 10B represents a presently disclosed exemplary embodiment with PZT rotation about the thickness axis of the unit cell at 60 degrees;

FIG. 10C represents a displacement plot at 500 Hz with a PZT orientation at 30 degrees, per the exemplary embodiment of FIG. 10A;

FIG. 10D represents a displacement plot at 500 Hz with a PZT orientation at 60 degrees, per the exemplary embodiment of FIG. 10B;

FIG. 18 represents a Table based on a numerical study of the dimensions and arrangement for the exemplary embodiment of FIG. 17, with a first column identifying each of respective six cells of the FIG. 17 embodiment, followed by a column of the indicated diameter of each respective cell, followed by a column reflecting the energy harvestable frequency (in Hz) for each such cell;

FIG. 19A illustrates a displacement plot relatively representing energy production, at 12 Hz for the arrangement of the exemplary embodiment of a unit cell or AEMM structure in accordance with the presently disclosed subject matter (as shown in FIG. 17), having a 24 mm diameter;

FIG. 19B illustrates a displacement plot relatively representing energy production, at 82 Hz for the arrangement of the exemplary embodiment of a unit cell or AEMM structure in accordance with the presently disclosed subject matter (as shown in FIG. 17), having a 12 mm diameter.

Figure 1:
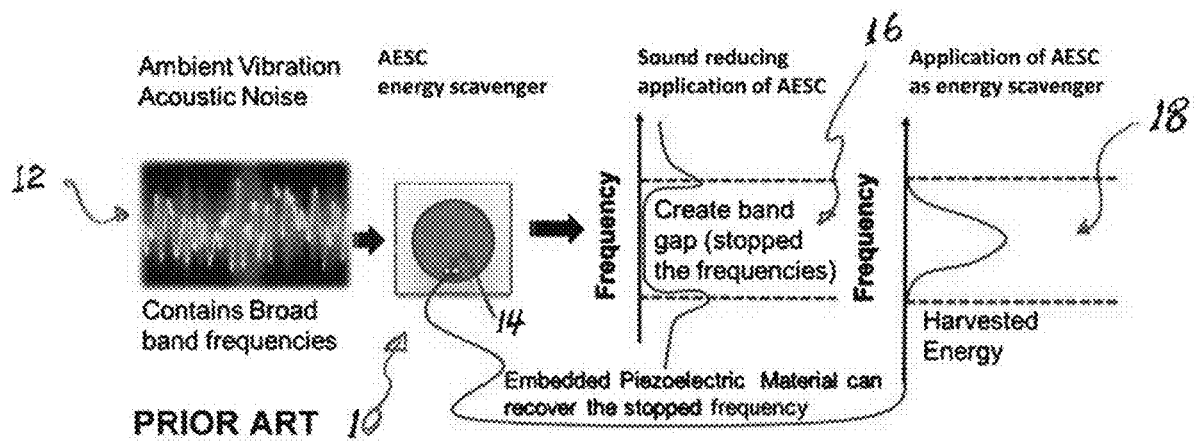
FIG. 1 represents a prior art wave filtration and energy scavenging mechanism using an acoustoelastic sonic crystal, being exposed to an ambient vibration acoustic noise environment generally which contains broadband frequencies.
Figures 2A, 2B:
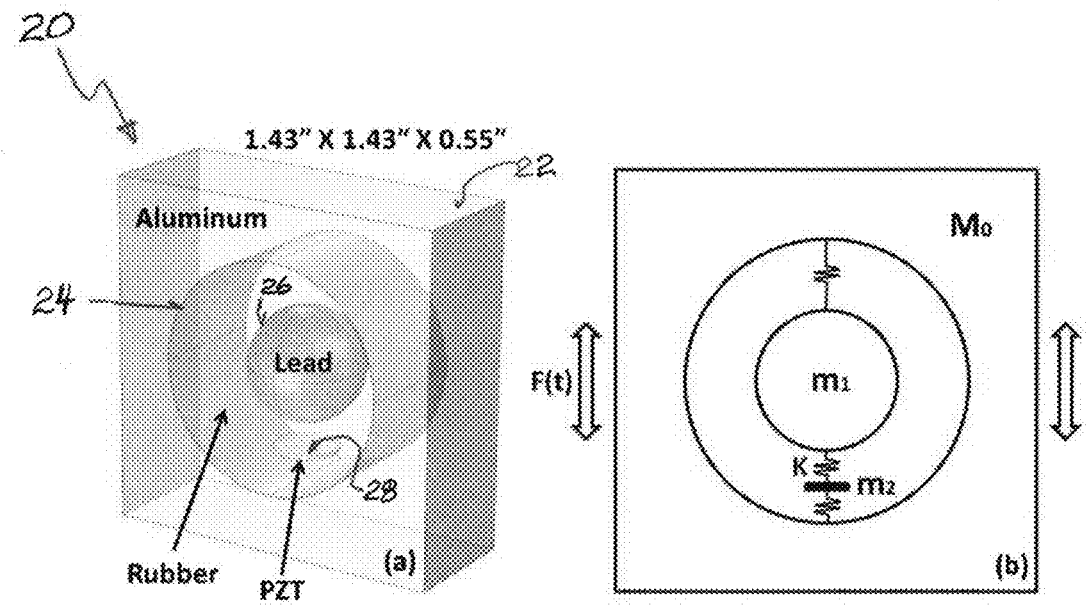
FIG. 2A illustrates a three dimensional representation of a prior art unit-cell acoustic metamaterial prism.
FIG. 2B illustrates a spring-mass representation of the prior art unit-cell acoustic metamaterial prism, as represented in prior art FIG. 2A.
Figure 3:
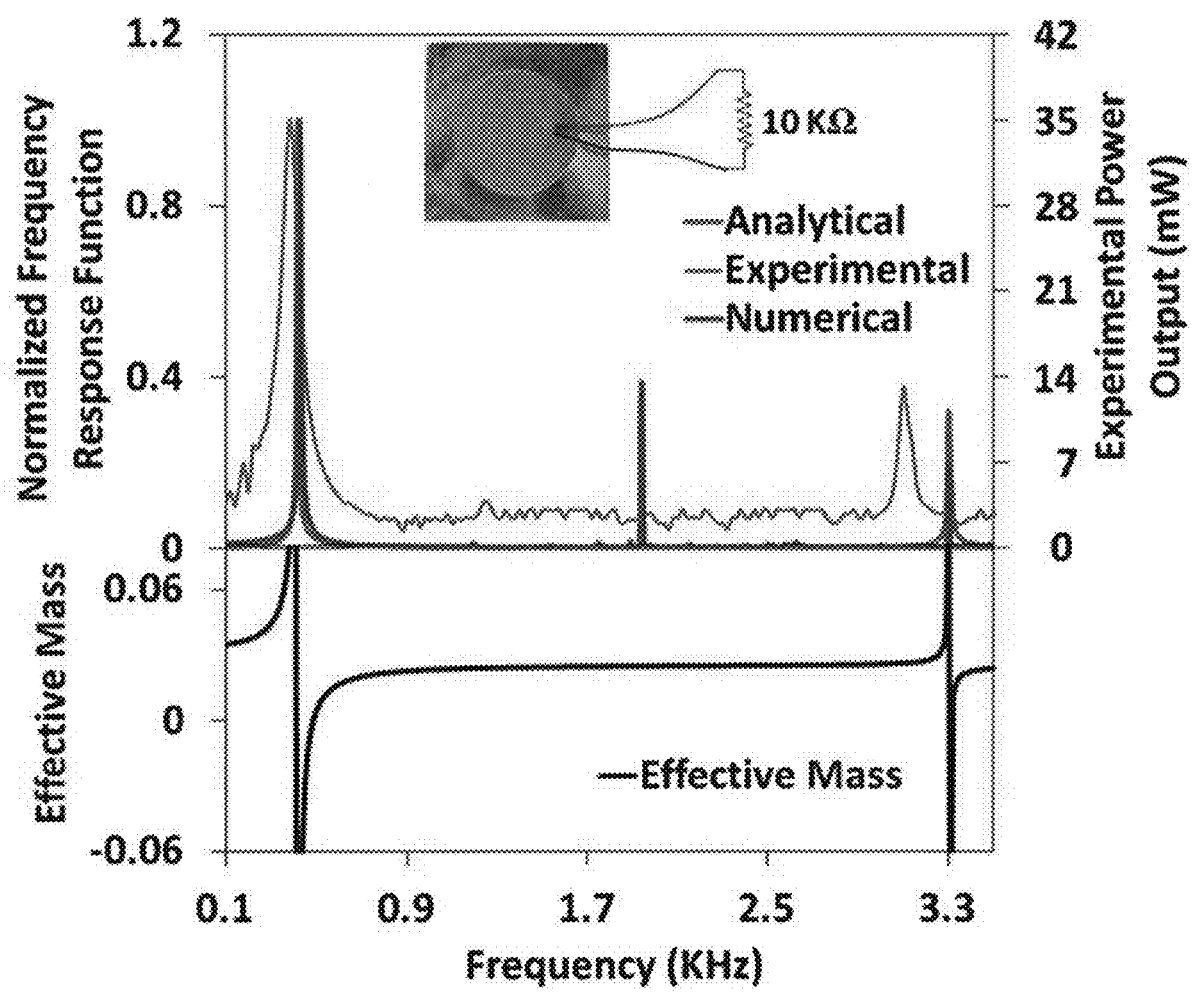
FIG. 3 illustrates analytically, numerically, and experimentally obtained dynamic Frequency Response Function for a resistive load of 10 KΩ, with analytically computed dynamic effective mass plotted at the bottom thereof, all with reference to the prior art unit-cell acoustic metamaterial prism of FIGS. 2A and 2B.
Figure 4:
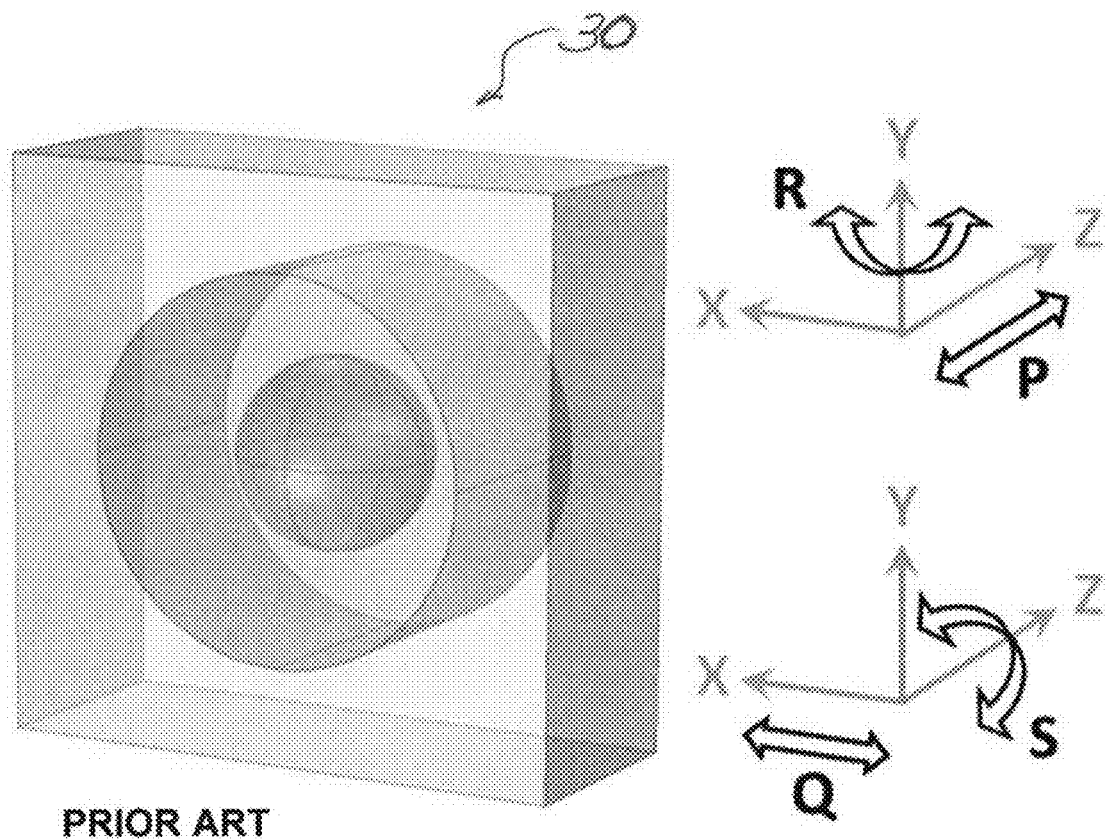
FIG. 4 illustrates the harmonic excitation directions of the prior art unit cell of FIGS. 2A and 2B, indicating the different local resonance modes thereof (including as designated modes P, Q, R, and S)
Figure 5:
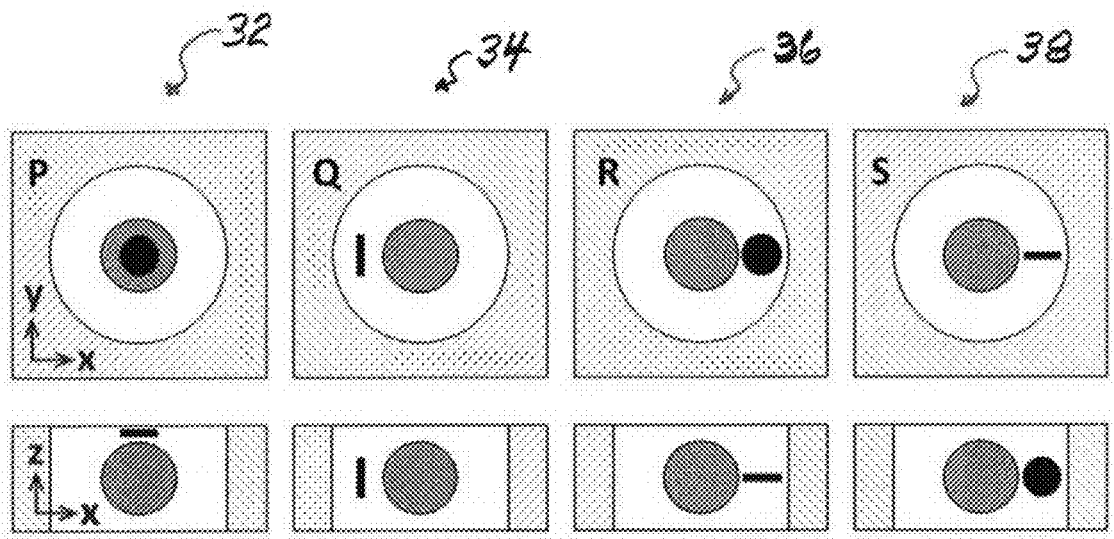
FIG. 5 represents four illustrations of prior art placements of respective mode P, Q, R, and S piezoelectric wafers inside the soft core of the prior art unit cell of FIGS. 2A and 2B, with the top row of FIG. 5 illustrating plan views thereof and the bottom row illustrating side views thereof.
Figure 6:
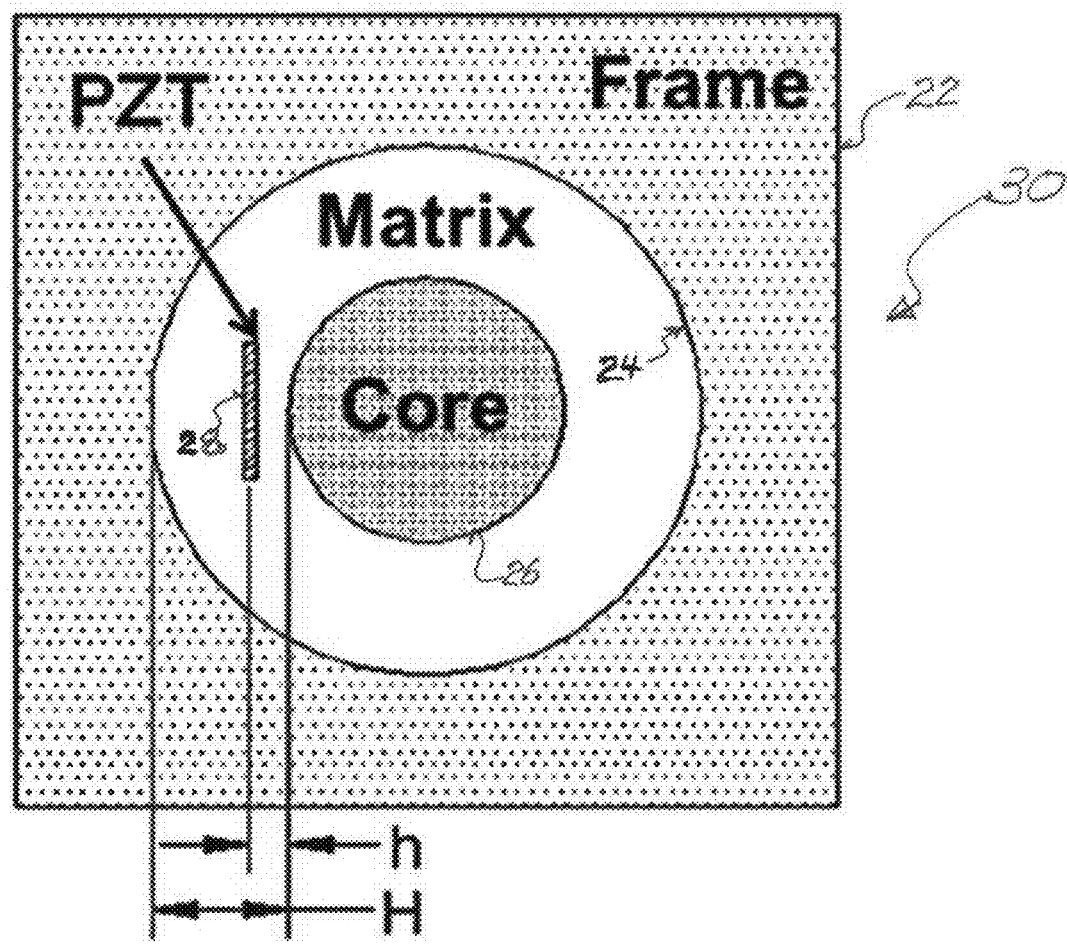
FIG. 6 represents prior art piezoelectric wafer/PZT placement inside the prior art unit cell of FIGS. 2A and 2B, to harvest energy from mode Q thereof.
Figure 7A:
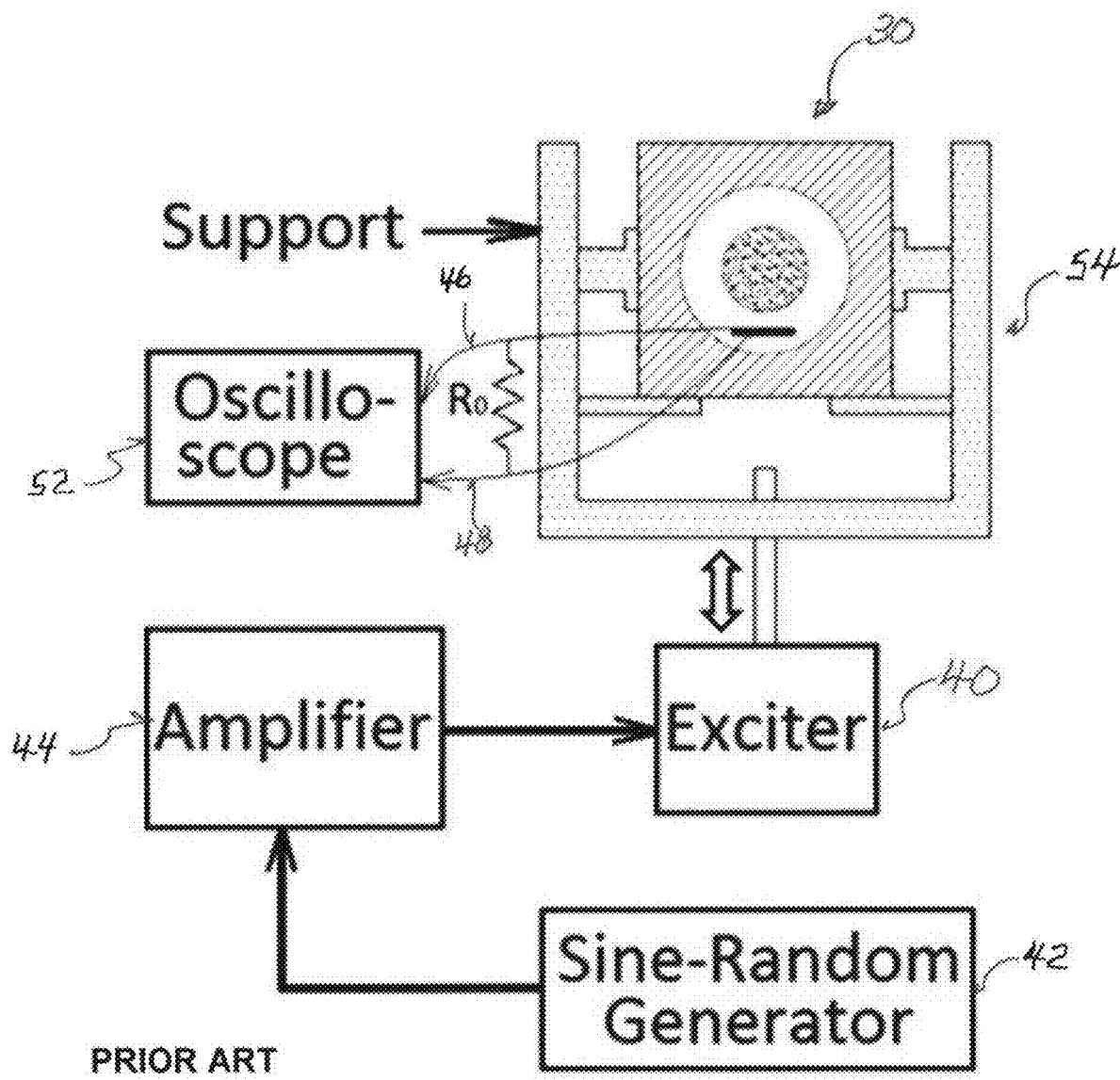
FIG. 7A illustrates a schematic diagram of an arrangement for measuring results with the prior art unit cell of FIGS. 2A and 2B.
Figure 7B:
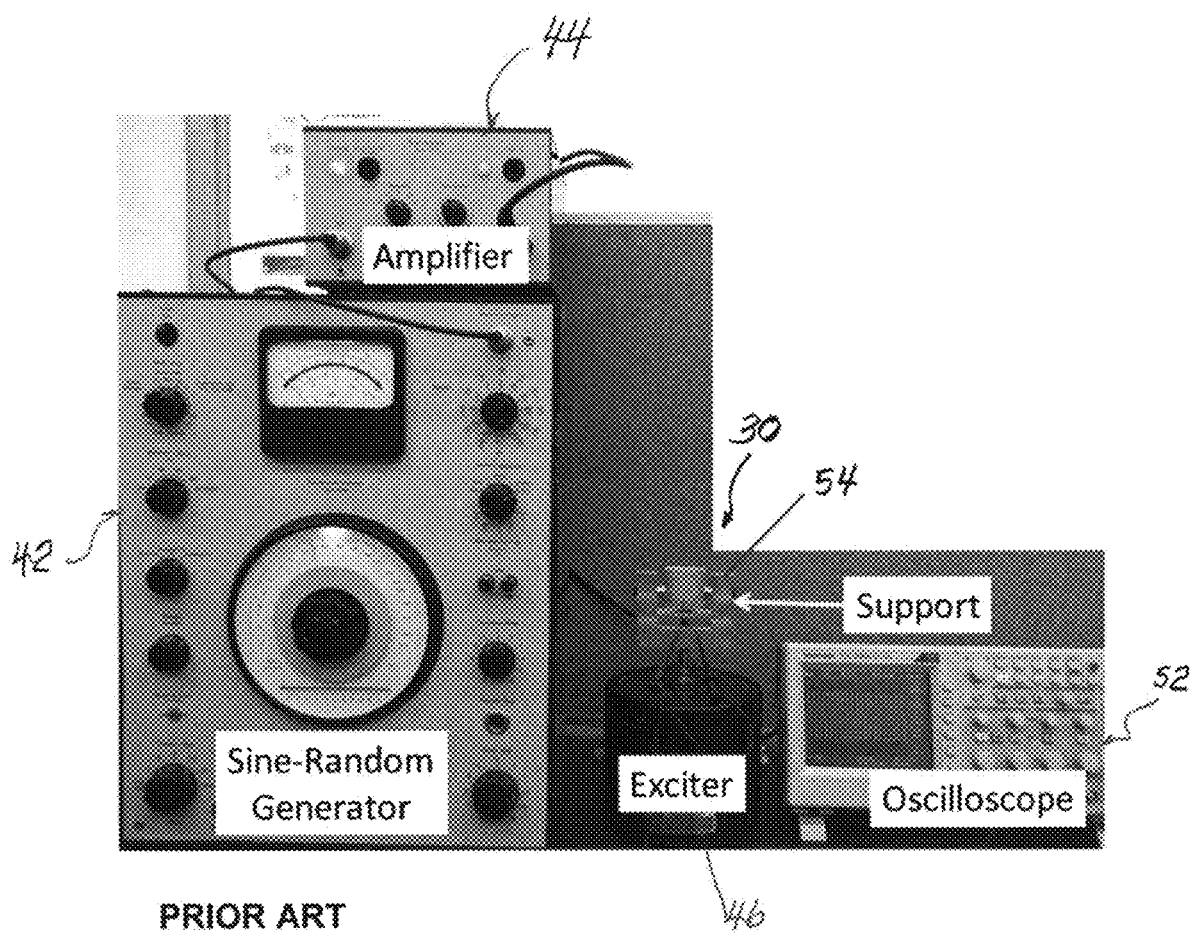
FIG. 7B pictures equipment for the experimental arrangement, as shown schematically in FIG. 7A, for measuring results with the prior art unit cell of FIGS. 2A and 2B.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

Reference will now be made in detail to various embodiments of the presently disclosed subject matter, one or more examples of which are set forth below. Each embodiment is provided by way of explanation of the subject matter, not limitation thereof. In fact, it will be apparent to those skilled in the art that various modifications and variations may be made in the presently disclosed subject matter without departing from the scope or spirit of the subject matter. For instance, features illustrated or described as part of one embodiment, may be used in another embodiment to yield a still further embodiment, and corresponding and/or associated methodologies may be practiced relative to apparatus disclosed and/or suggested herewith, all of which comprise various embodiments of the presently disclosed subject matter.

In general, the presently disclosed subject matter relates to low frequency energy harvesting at multiple frequencies. In particular, exemplary embodiments of the presently disclosed subject matter provide the possibility to harvest electric potential at multiple acoustic frequencies from a unit cell metamaterial. The presently disclosed embodiments comprehensively provide for multi-frequency energy harvesting, including using placements of a single embedded piezoelectric wafer (lead zirconate titanate, "PZT") or multiple PZTs in a single unit cell.

Figure 8:
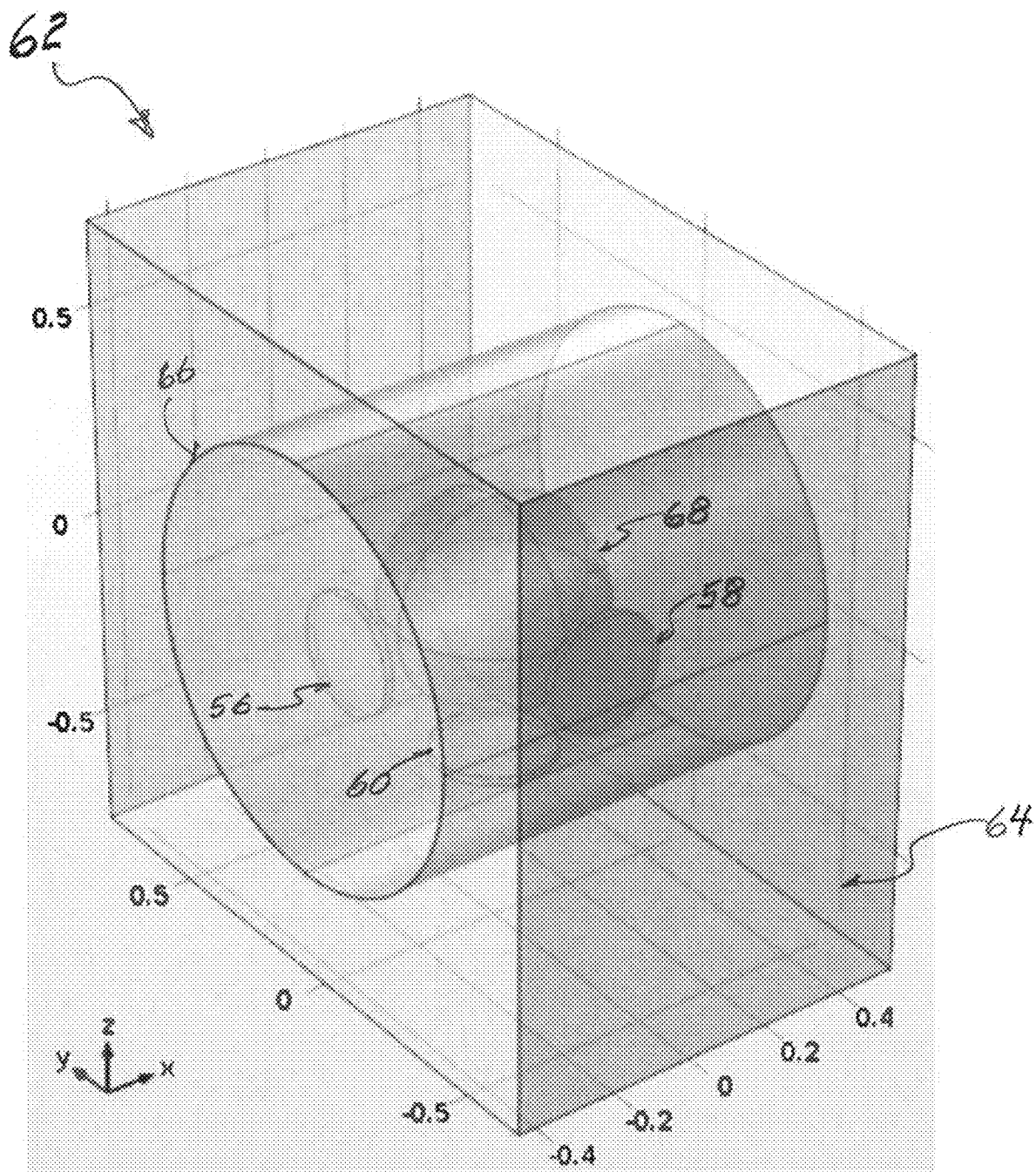
FIG. 8 illustrates an exemplary embodiment of the presently disclosed subject matter, illustrating in partial see-through perspective a multi-PZT orientation for use in an exemplary AEMM.

FIG. 8 represents an exemplary embodiment of the presently disclosed subject matter utilizing a multi-PZT orientation and arrangement to harvest energy at multiple frequencies and to allow the possibility to harvest energy in different loading conditions. Specifically, three PZTs 56, 58, and 60, respectively, are provided for vibration relative to the x-, y- and z-directions, respectively, as shown in FIG. 8. Cell unit generally 62 includes a frame 64 enclosing a matrix 66 which receives a core 68, with PZTs 56, 58, and 60 positioned relative to such core in respective positions as shown. Understanding how PZT orientation and positioning shows the possibility to introduce new local resonance modes in accordance with presently disclosed subject matter is more fully understood beginning with consideration of embodiments disclosed herewith which utilize a single PZT.

As discussed herein with reference to FIGS. 1 through 7B, it has already been shown that using an AEMM embodiment, four local resonance (energy trapping) modes can be introduced within a 1 KHz range. Specifically with reference to so-called mode Q, it has been shown that placing a piezoelectric material perpendicular to the loading direction in between the core resonator and the cavity wall is an appropriate orientation for harvesting energy. The presently disclosed subject matter further shows that with selected placement of piezoelectric material, significant energy can be scavenged from the other modes (P, R and S) as well.

FIG. 9 herewith includes in table form presently disclosed subject matter for harvesting energy at such other modes (P, R and S), including description of orientation of the piezoelectric material. For the sake of completeness, the prior information regarding mode Q is also listed in the table of FIG. 9. As stated per FIG. 9, P and Q modes both relate to vibrations of a PZT in respective thickness and width directions of the subject unit cell, while modes R and S relate to rotations of a PZT in respective width and thickness axis directions of the unit cell structure.

For some exemplary embodiments of presently disclosed subject matter, PZT 5H may be employed as the energy conversion medium in harvesting energy from mode Q. It has been observed that without PZT placement in the structure, mode Q is found at about 415 Hz; however, the mode shifts to about 430 Hz with the PZT addition.

Per the presently disclosed subject matter, it is also a phenomenon that the PZT orientation and placement significantly manipulates the vibration modes in the AEMM. Other vibration modes in the AEMM (P, R and S) are extinguished after placing the PZT inside. It should be understood that since the mass and stiffness of the piezoelectric material is considerable compared to the constituents of the unit cell, it plays significant role in the vibration patterns of such constituents. However, by selectively choosing appropriate piezoelectric material (including its shape and placement) in accordance with subject matter presently disclosed herewith, significant energy can be scavenged from the P, R and S modes without affecting the vibration modes due to the addition of the PZT material.

Numerical consideration helps to understand the PZT effect in vibration modes in greater detail, at various orientations of the PZT in the unit cell. Keeping all other parameters constant, the piezoelectric material is rotated about the thickness axis of the cell with at intervals of 30 degrees. FIGS. 10A and 10B respectively show two sample orientations (at 30 degrees and 60 degrees, respectively) of the PZT, while FIGS. 10C and 10D respectively confirm the mode manipulation feature of the AEMM through PZT orientation. While with 0 degrees PZT orientation, only the Q mode exists, additional local resonance modes are achieved due to utilization of rotated PZT orientation in accordance with the presently disclosed subject matter. Stated another way, FIG. 10A shows the presently disclosed PZT rotation about the thickness axis of the unit cell at 30 degrees, with FIG. 10B illustrating the same arrangement but rotated at 60 degrees, while FIG. 10C represents a displacement plot at 500 Hz with such PZT orientation at 30 degrees, with FIG. 10D illustrating the same plot but with the PZT orientation rotated at 60 degrees.

Also, per presently disclosed exemplary embodiments, two local resonance modes are always in existence. These include along the so-called loading axis, which axis is represented in FIG. 10A with double-headed arrow 70, and along the PZT thickness axis. In FIG. 10A, the center axis of PZT 72 is shown as being 30 degrees offset from the axis in the direction of such loading axis 70 from core 74. In FIG. 10B, the center axis of PZT 76 is shown as being 30 degrees offset from the axis in the direction of such loading axis 70 from core 78. Those of ordinary skill in the art will understand from the complete disclosure herewith that the thickness axis for each of PZT elements 72 and 76 is the direction along the 30 degrees or 60 degrees offset axis from loading axis 70. Since in mode Q, both the loading axis and the PZT thickness axis coincide, only one mode exists with 0 degrees PZT orientation. It should be understood also that the second mode doesn't exist only if the PZT thickness axis is perpendicular to the loading axis. Based on such outcome from embodiments of the presently disclosed subject matter, additional embodiments (such as, using multiple PZT, using variable PZT, and optimizing orientations) are possible in order to further introduce new local resonance modes and optimize the power output from a unit cell AEMM.

Referring back to FIG. 8 (which illustrates in partial see-through perspective an exemplary embodiment of a multi-PZT orientation arrangement for use in an exemplary AEMM of the presently disclosed subject matter), PZT orientation shows the possibility to introduce new local resonance modes. As shown, the multi-PZT orientation allows for harvesting energy at multiple frequencies and allows the possibility to harvest energy in different loading conditions.

Figure 11:
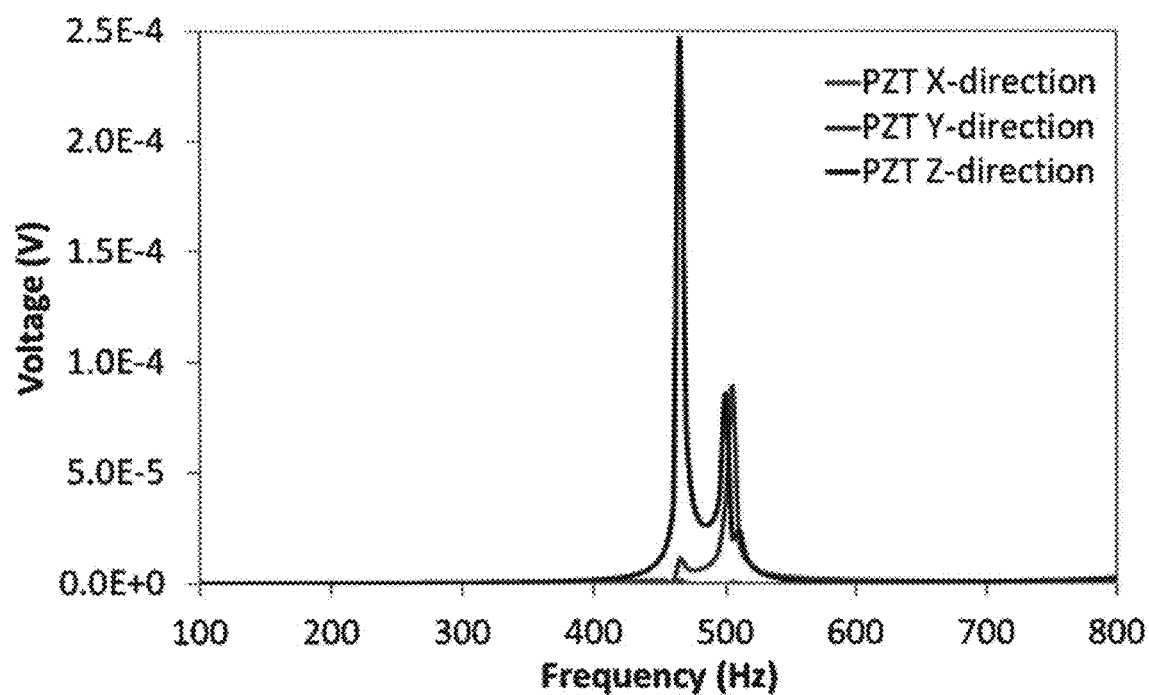
FIG. 11 illustrates the voltage output from all PZTs for y-directional excitation, per a given exemplary embodiment of the presently disclosed subject matter.
Figure 12:
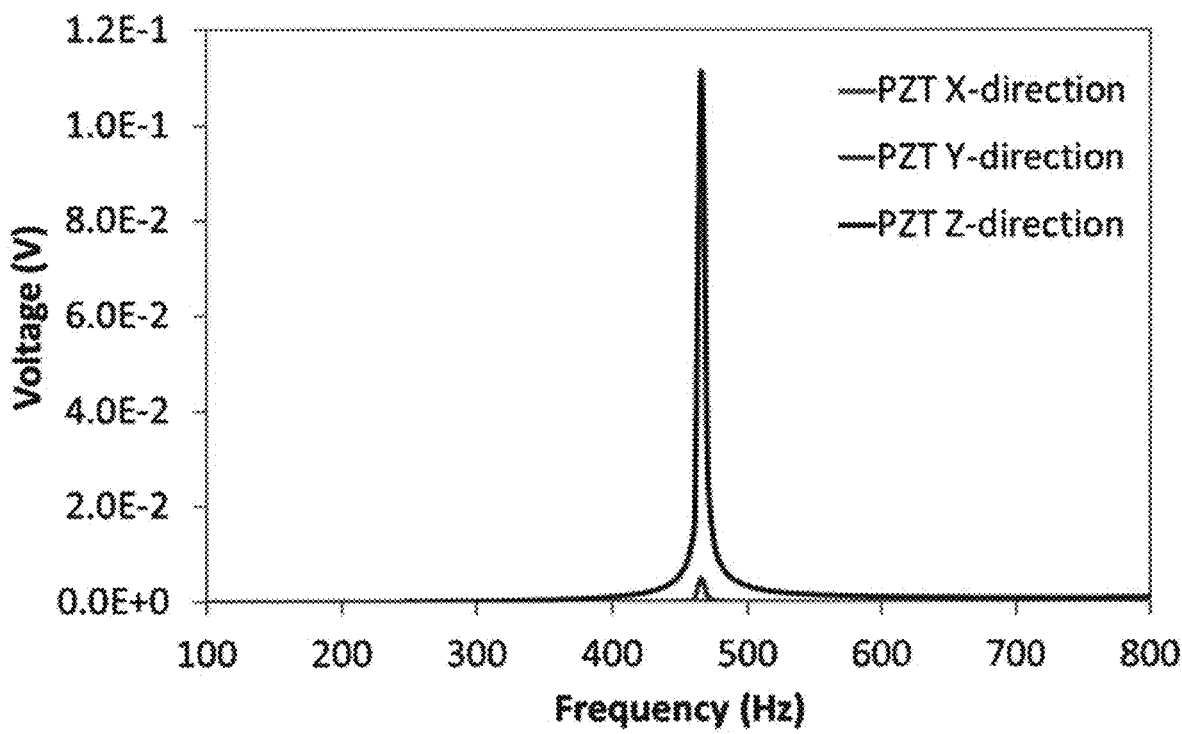
FIG. 12 illustrates the voltage output from all PZTs for z-directional excitation, per a given exemplary embodiment of the presently disclosed subject matter.

Per the FIG. 8 exemplary embodiment, to accommodate the PZT in the x-direction, unit-cell thickness is increased such that each PZT locates at the middle of core resonator 68 and matrix surface 66. FIGS. 11 and 12, respectively, show the voltage response from all three PZTs of a presently disclosed exemplary embodiment under y-directional and z-directional controlled vibrations, respectively. Results with exemplary embodiments of the presently disclosed subject matter show that the body mass of a resonator (or, gravity) always acts in the z-direction, which plays a significant role in vibration modes and power generation.

Per the presently disclosed subject matter, three local resonance modes can be obtained due to placement of three PZTs in the unit cell irrespective of the loading direction. For an exemplary embodiment, three local resonance modes are found at 335 Hz, 500 Hz, and 465 Hz for resonator vibration along the x-, y- and z-directions, respectively. However, due to gravity effect, z-directional vibration always plays a significant role in getting voltage output from the whole cell. While a unit cell is vibrated in the y-direction, it ordinarily should obtain maximum energy from the PZT perpendicular to the Y-direction at 500 Hz, compared to other PZTs. However, due to gravity effect, the resonator tends to vibrate along z-direction, even though a y-directional excitation is applied. Therefore, at 465 Hz, considerably larger resonance takes place along the z-direction, which provides relatively higher voltage output from the Z-directional PZT. On the other hand, voltage response at 335 Hz, from the X-directional PZT, is considerably negligible due to two reasons: (1) off-directional excitation, and (2) open or free matrix surface. Having a free matrix surface or not having a stiff enclosure in x-direction, allows the matrix to flow with little resistance, which makes for very little strain energy in PZT surface.

On the other hand, when the unit cell is excited along z-direction, the excitation direction and gravity direction merge, which results in a relatively high power output from the Z-directional PZT. Due to such relatively strong presence of z-directional resonance, voltage output from other PZTs are almost negligible, as shown in FIG. 12.

Another facet or aspect for some embodiments of the presently disclosed subject matter relates to PZT placement optimization. For example, with reference to the exemplary embodiment represented by FIG. 13A, to convert trapped strain energy into electrical potential at a selected mode Q, a piezoelectric wafer generally 80 (ϕ about 7 mm, thickness=about 0.5 mm, mass=about 0.16 gm) is embedded inside the matrix generally 82 in between the lead core 84 and the cavity wall 86. Previously, for sensing applications, it has been known that distinct FRF pick can be obtained from the selected mode Q by placing the PZT at the middle between the core resonator and the cavity wall. For such sensing applications, having an FRF pick is more important than the FRF amplitude.

Figure 13A:
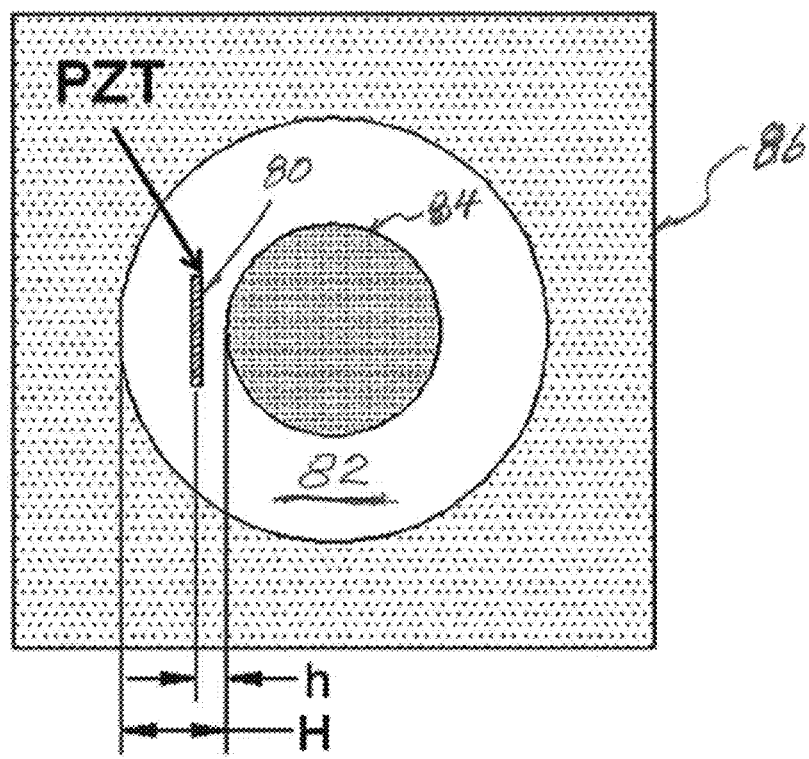
FIG. 13A illustrates an exemplary position of a PZT of an exemplary embodiment of the presently disclosed subject matter, optimized for producing electric potential.
Figure 13B:
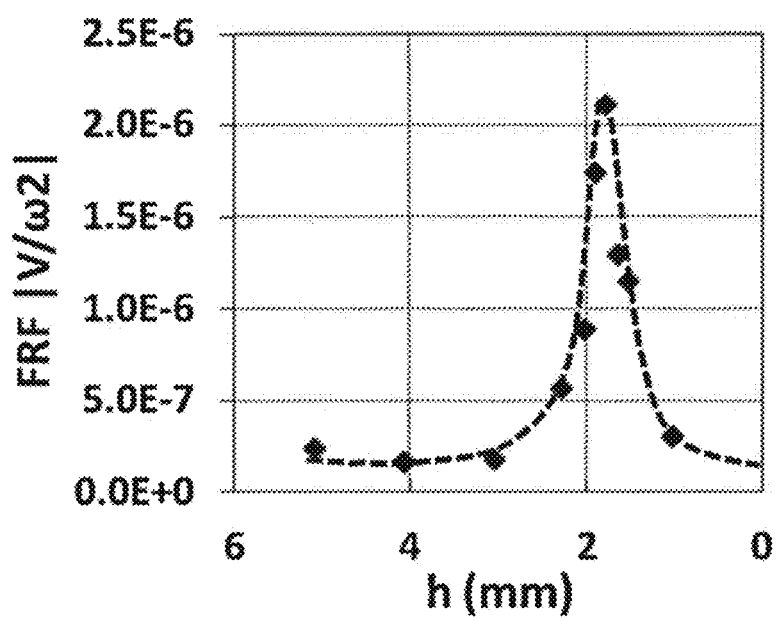
FIG. 13B graphically represents FRF output with respect to a designated distance 'h' between the PZT and core mass of the exemplary embodiment of FIG. 13A.

However, the presently disclosed subject matter is more focused on efficient energy harvesting, for which FRF amplitude is a relatively more important factor for an energy harvester. Therefore, there can be greater significance in selecting or designating an exact distance of the PZT from the resonator to have the maximum voltage output. As represented by FIG. 13A, such distance of the PZT from the resonator may be termed as 'h.' A numerical study for the exemplary embodiment of FIG. 13A suggests (as shown by the graph of FIG. 13B) that the amplitude of the Frequency Response Function (FRF) follows a Gaussian function with respect to 'h' and that FRF is maximum when h=1.78 mm. Such value of "h" is 1/3.5 times of the distance between center mass and cavity wall (termed as CH', which equals 6.23 mm).

Another facet or aspect for some embodiments of the presently disclosed subject matter relates to geometric optimization. With reference to a device's effective mass (discussed herein in conjunction with an effective mass equation), effective mass (and hence, local resonance) of a system generally depends on mechanical properties and geometric configuration of the cell constituents. Therefore, per presently disclosed subject matter, power output and local resonance frequency of a given system can be altered significantly through the variation of cell geometry and material selection.

The geometric variations available per the presently disclosed subject matter permit application of the presently disclosed technology in a number of different and flexible settings and environments. One advantageous aspect of certain presently disclosed AEMM embodiments is that some such AEMM embodiments are capable of harvesting energy at very low acoustic frequencies; yet, while keeping the geometry unchanged, the harvesting frequency can easily be shifted towards relatively higher frequency levels by only varying the material properties involved. In other words, the subject design of such AEMM embodiments is versatile and flexible, depending on the materials selected for use in a given embodiment. With such approach, exemplary embodiments may be adjusted by those of ordinary skill in the art to be employed in a wide variety of engineering applications. Several particular applications of presently disclosed exemplary AEMM embodiments are disclosed herewith.

Highway traffic noise is a common problem, tending to be a dominant noise source in urban, as well as rural, environments. Control of noise in everyday life is of significant importance because unwanted noise can cause stress related illness and severe noise can cause hearing damage. A noise barrier (also called a soundwall, sound berm, sound barrier, or acoustical barrier) is an exterior structure designed to protect inhabitants of sensitive land use areas from noise pollution. Noise barriers are commonly employed as one of the more effective methods of mitigating roadway, railway, and industrial noise sources, apart from actual interruption of the source activity or use of source controls.

Figure 14A:
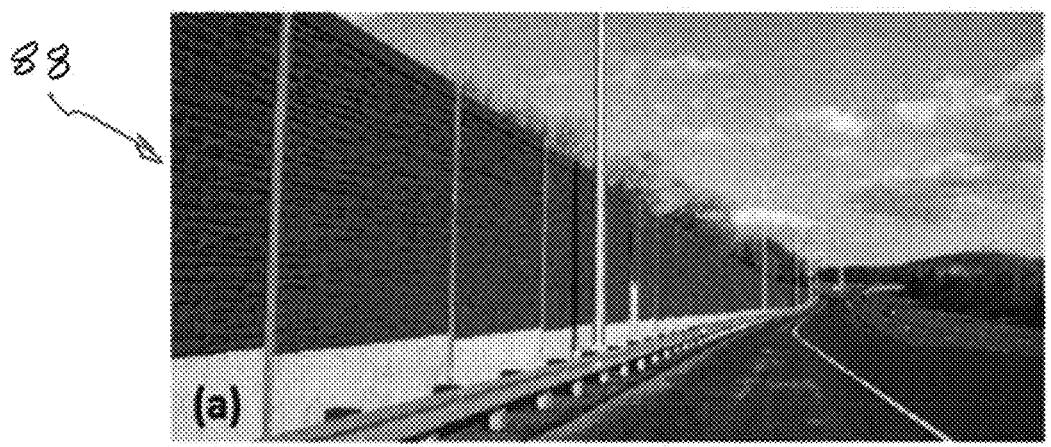
FIGS. 14A, 14B, and 14C represent typical prior art noise barriers in various arrangements for use in association with highway, railway, and industrial environments, respectively.

Noise barriers typically are solid obstructions built between a sound source and an area of intended protection. For example, they may be built between a highway and homes along a highway. FIG. 14A illustrates one example of a series of such prior art noise barriers generally 88 adjacent a road or highway generally 90. An area intended for protection, such as homes (not seen in the illustration of FIG. 14A), would typically be located on the opposite side of barriers 88. Barriers 88 typically do not completely block all noise, but instead only reduce overall noise levels. Effective noise barriers typically reduce noise levels by 5 to 10 decibels (dB), cutting the loudness of traffic noise by as much as one-half. For example, a barrier which achieves a 10-dB reduction can reduce the sound level of a typical tractor trailer passing by to that of only a typical automobile passing by.

Figure 14B:
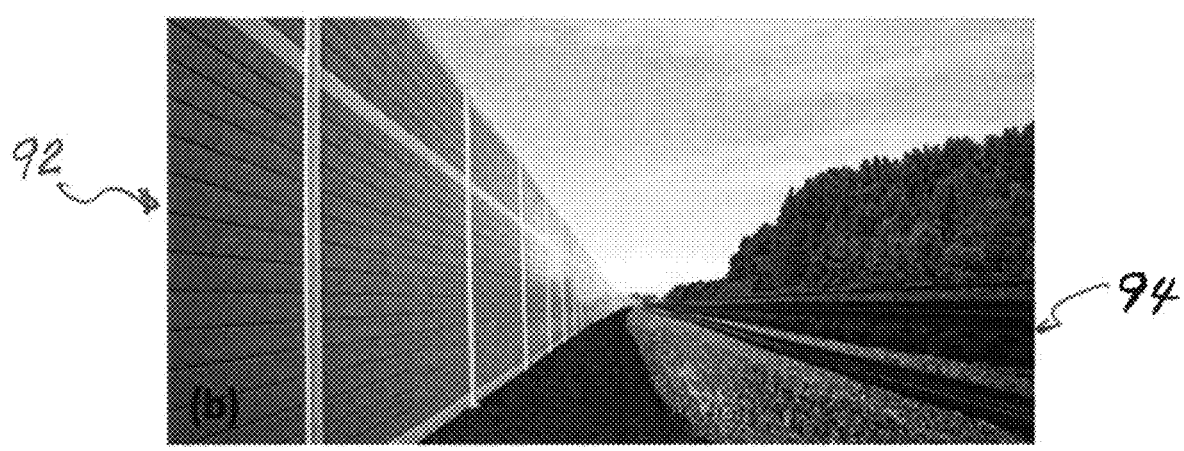
Figure 14C:
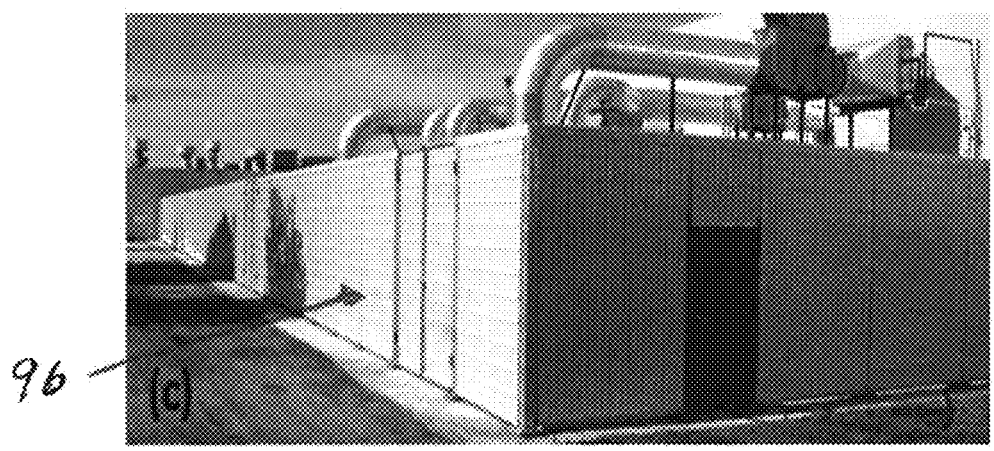

FIG. 14B represents another typical use of a noise barrier arrangement, with prior art noise barriers generally 92 situated adjacent a railway generally 94. FIG. 14C represents an industrial site for which prior art noise barriers generally 96 are applied directly to exterior surfaces of an industrial building.

While FIGS. 14A through 14C each represent the use of prior art barriers in association with various arrangements or environments, it is to be understood that a unit cell or an AEMM structure in accordance with presently disclosed subject matter could be utilized in a sound barrier in such combinations or others. In other words, each of FIGS. 14A through 14C also represent potential uses of the presently disclosed subject matter, once incorporated into a barrier arrangement.

Conventional noise barriers (such as those illustrated in FIGS. 14A through 14C) transmit, absorb, or reflect acoustic waves as part of a noise filtering process or function. As noted, even so, such noise barriers are not capable of fully filtering such acoustic noise, but instead just attenuate the noise db to an extent. As discussed herewith, unit cells or AEMM structures as disclosed herewith may be incorporated as potential material for a noise barrier structure. For example, any of the cells or AEMM structures of application FIG. 8, 10A, 10B, or 13A could be incorporated into a noise barrier arrangement, and then used in various combinations, such as those represented by FIGS. 14A through 14C. Thus, such figures represent combinations and methodologies which may be practiced in accordance with presently disclosed subject matter, incorporating use of presently disclosed unit cells or AEMM structures.

Using a presently disclosed AEMM or unit cell embodiment, acoustic noise is attenuated much more efficiently compared to prior art barriers. For the functionality of stopping acoustic noise, a unit cell or AEMM structure barrier built in accordance with presently disclosed subject matter is better able to absorb acoustic energy more precisely, while also accomplishing the energy harvesting methodology otherwise discussed herewith, by which the absorbed energy is efficiently converted to electric potential.

Figure 15:
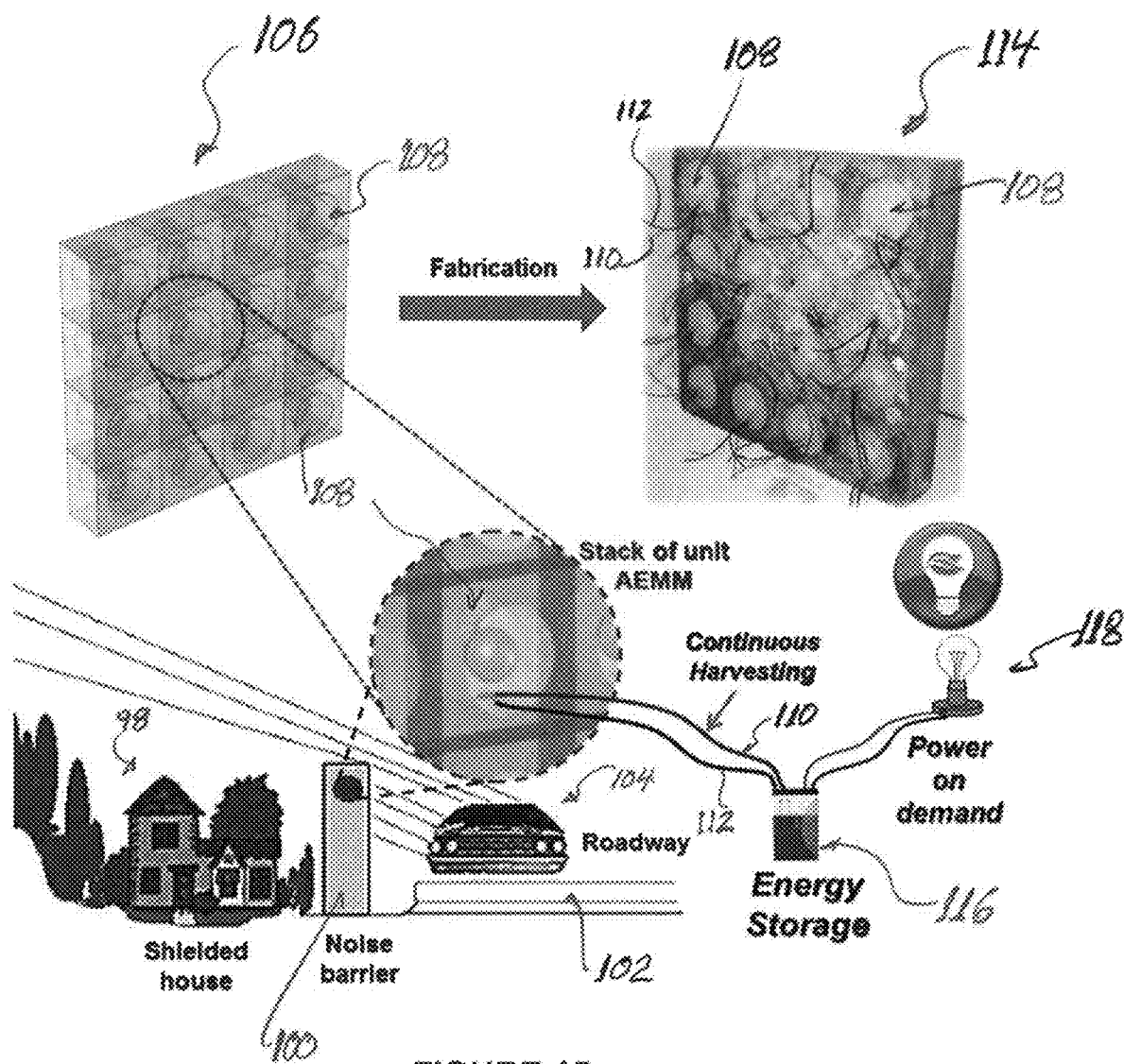
FIG. 15 is a diagrammatic representation of a presently disclosed unit cell or AEMM structure-based noise barrier, simultaneously performing the duel operations or functionality of both noise control and energy harvesting.

FIG. 15 is a diagrammatic representation of a presently disclosed unit cell or AEMM structure-based noise barrier, simultaneously performing the duel operations or functionality of both noise control and energy harvesting. Since thickness of the unit cell or AEMM structure disclosed herewith is considerably small compared to that of traditional noise barriers, multiple AEMM or unit cell layers can be used in fabricating such a wall for multi-layer and highly effective filtration processes. Also, while such noise controlling process is achieved, the AEMM or unit cell built wall has the capability of generating significantly large power output since numerous such unit AEMM structure (for example, perhaps hundreds of thousands or even potentially in the millions) may be accommodated or achieved in a relatively longer barrier (for example, one which is 100 meters long).

FIG. 15 diagrammatically represents such an indefinite length barrier formed with multiple presently disclosed unit cell or AEMM structures. A shielded house representation generally 98 may represent a plurality of houses, such as a subdivision, or group of townhomes, for which a barrier generally 100 in accordance with presently disclosed subject matter is erected between the home or homes and a roadway generally 102 on which vehicle traffic generally 104 travels. An enlarged segment generally 106 of barrier 100 may comprise an arrangement of a plurality of presently disclosed unit cell or AEMM structures, which may be arranged in various patterns, geometric or otherwise. Additionally, different types of unit cell or AEMM structures as disclosed herewith may be combined in various devices or barriers in order to provide different embodiments of the presently disclosed subject matter.

As further represented by FIG. 15, the enlarged segment 106 is in turn comprised of respective individual cells or structures generally 108. Each of those cells or structures generally 108 may be electrically connected by wiring generally 110 and 112 (or by other means now known or later created), for harvesting of electrical energy generated by the respective device 108. Segment generally 114 of barrier 100 represents that each such cell or device 108 may respectively be electrically connected in order to harvest its electrical output. As further shown by FIG. 15, the harvested electrical energy can be either stored in an energy storage mechanism 116 (such as an energy cell or battery of some type), or used a power on demand generally 118. Such power on demand can represent any type of present use of energy as it is created. Alternatively, combinations of use of demand and storage for later use may be practiced, depending on needs or circumstances involved with a particular embodiment of the presently disclosed subject matter, all as will be understood by those of ordinary skill in the art from the complete disclosure herewith.

While FIGS. 14A and 14B represent how presently disclosed subject matter barriers, fabricated as in FIG. 15 herewith, or otherwise comprising embodiments of presently disclosed subject matter, may be used in typical barrier environments relative to passing traffic. However, it should be understood that barriers fabricated as in FIG. 15 herewith, or otherwise comprising embodiments of presently disclosed subject matter, may equally be used in environments as represented in FIG. 14C. In other words, since control of noise and vibration is also very important in industrial environments for the quality of workers' health and safety, it should be understood that the presently disclosed subject matter can be very effective for such industrial applications (FIG. 14C) as well.

While FIGS. 14A through 14C are marked as being prior art, if the indicated prior art barriers are replaced with barriers in accordance with the presently disclosed subject matter (such as per FIG. 15 or otherwise), then such FIGS. 14A through 14C also in such context represent embodiments of the presently disclosed subject matter.

The presently disclosed AEMM (or unit cell) based energy harvester is capable of harvesting at relatively very low frequency levels, while also having significant flexibility to alter its operating frequency level by only changing the constituent's material property or geometric configuration. Accordingly, some embodiments of the presently disclosed subject matter may be practiced as an AEMM or unit cell energy harvester which is possible to use for relatively low power electronics (such as a cell phone, i-pad, or similar) that can scavenge electric potential from low frequency ambient vibrations (for example, such as vibrations from traveling in a car or if worn by a user while jogging).

Figure 16:
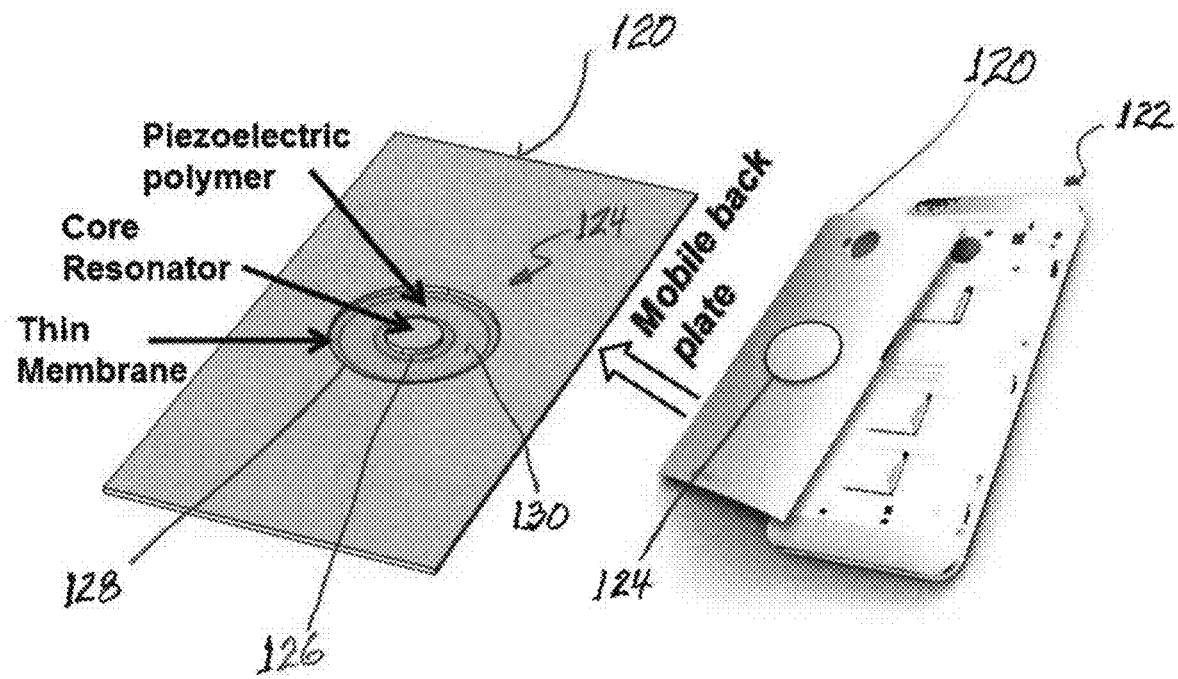
FIG. 16 illustrates a perspective view of an electronic device (such as a cell phone) with the back plate thereof replaced with a presently disclosed plate which incorporates an AEMM or unit cell harvester in accordance with presently disclosed subject matter.

For example, as represented by the perspective view of FIG. 16, a typical plate, such as a back plate, of an electronic device (such as a cell phone) may be replaced with a presently disclosed plate 120 which incorporates an AEMM or unit cell harvester in accordance with presently disclosed subject matter. Or an existing plate may be retrofit with presently disclosed subject matter. As shown by FIG. 16, a mobile back plate generally 120 of a device 122 (such as a mobile phone) may be modified or replaced so at to incorporate an AEMM or unit cell harvester generally 124. Such modified AEMM unit cell 124 per presently disclosed subject matter is shown by the enlarged illustration of FIG. 16 as including a relatively heavy core resonator generally 126, a relatively very thin membrane 128, and a flexible piezoelectric polymer 130. The flexible membrane 128 is strongly attached to the mobile back plate 124, and holds the core resonator 126 and the piezoelectric polymer 130. Both resonator 126 and piezoelectric polymers 130 are firmly glued with the membrane 128. Exemplary dimensions of one exemplary embodiment of plate 124 may be 120 mm×60 mm×1 mm.

For exemplary purposes, materials such as variations of steel, silicon, and polyvinylidene fluoride (PVDF) may be practiced as the materials for core resonator 126, thin membrane 128, and piezoelectric polymer 130, respectively. Similar to other AEMM structure embodiments disclosed herewith, such modified AEMM embodiment generally 124 is also capable of introducing low frequency local resonance modes.

Figure 17:
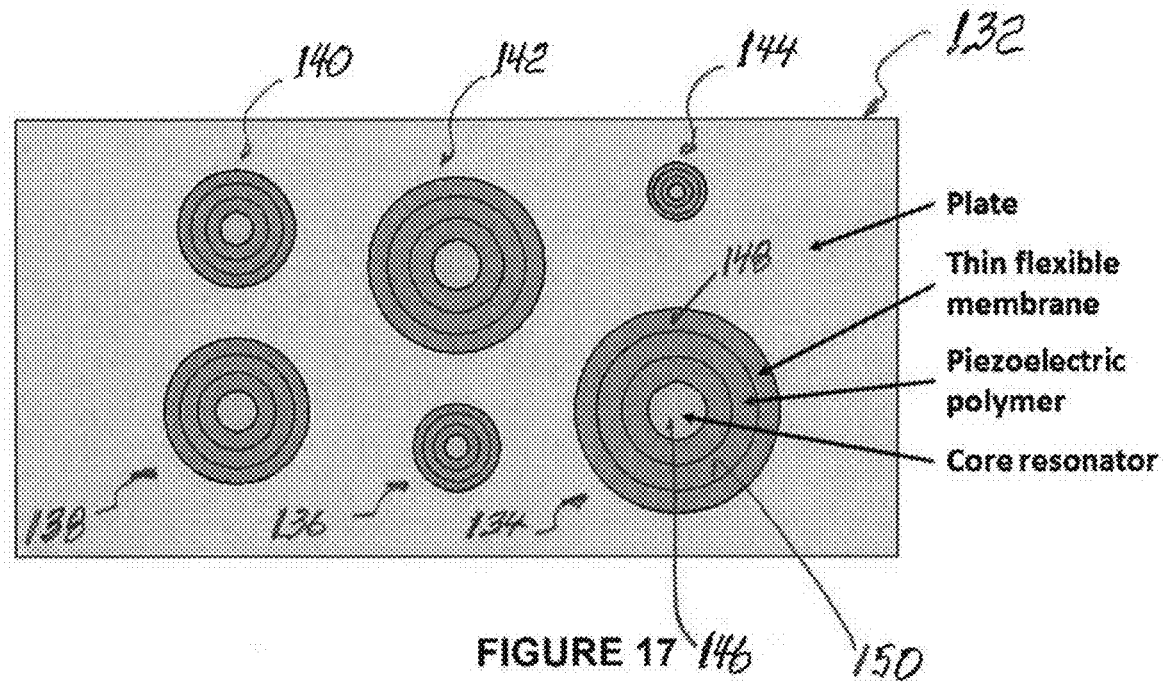
FIG. 17 illustrates an exemplary electronic device replacement back plate in accordance with presently disclosed subject matter, having a plurality of presently disclosed exemplary embodiment unit cells or AEMM structures, with representative varying exemplary diameters

While FIG. 16 illustrates use of only a single AEMM or unit cell 124, it may be desired or preferable in some embodiments of the presently disclosed subject matter to make use of plural cells for a single plate, such as represented by FIG. 17. In some embodiments, in order to maximize potential power output, it may be desired to use as many cells as a given plate can accommodate while maintaining acceptable minimum stiffness of the back plate. In some embodiments, each unit cell or AEMM may contain variable geometric configurations, which contributes to harvesting electric energy at a relatively wider range of ambient vibrations, in order to maximize power output in that context. FIG. 17 illustrates an exemplary back plate generally 132 having six (6) representative unit cells 134 through 144, with exemplary diameters of the largest to the smallest cells going from 28 mm to 8 mm in 4 mm increments.

Furthermore, the diameter of the core resonator in each cell 134 through 144 may be 1/3.5 times of the cell diameter. For example, the diameter of cell 134 may be 3.5 times the diameter of its core resonator generally 146. Cell 134 also has a thin flexible membrane portion 148 surrounding a piezoelectric polymer portion 150, similar to cell 124 of FIG. 16. It is also to be understood from FIG. 17 that each of respective cells 134 through 144 preferably have such core resonator, thin flexible membrane, and piezoelectric polymer structure, in each respective size as discussed.

Numerical study results of the dimensions and arrangement for the exemplary embodiment of FIG. 17 are shown per the Table of FIG. 18. Such Table of FIG. 18 shows a column identifying each of the respective six cells of the FIG. 17 embodiment, followed by a column of the indicated diameter of each respective cell, followed by a column reflecting the energy harvestable frequency (in Hz) for each such cell. As shown, extremely low frequency local resonance modes can be achieved using the exemplary embodiment of FIG. 17. At local resonance modes, the thin membranes of each respective cell encounter oscillatory motions due to the resonance behavior of their respective center masses. Such oscillations cause contraction and expansion in the respective piezoelectric polymers, which results in the production of electric potential.

As shown by FIG. 18, electrical energy can be harvested from ambient vibration of ~8 Hz from the biggest cell (cell 134) of the FIG. 17 embodiment while other cells achieve energy scavenging capabilities at increasing frequency levels with decreasing cell geometry (see FIG. 13). Table 2 lists the energy harvestable frequencies at different cells. FIGS. 19A and 19B respectively illustrate relative representations (displacement plots) of energy production at 12 Hz and 82 Hz, respectively, for the exemplary cells 142 and 136 of the FIG. 17 embodiment. The other cells are barely visible in the illustrations of FIGS. 19A and 19B because 12 Hz and 82 Hz do not specifically coincide with the local resonance frequencies of the other cells.

Using such presently disclosed technology for multi-frequency energy harvesting from ambient vibration, it is possible for one of ordinary skill in the art to design harvesters for a wide variety of ambient frequencies. For example, while FIG. 17 represents the specific embodiment of replacing a mobile device back plate with presently disclosed AEMM or unit cell energy harvester subject matter, other variations would be possible such as using the presently disclosed technology for a relatively much smaller portable energy harvester embodiment. Such an embodiment may be used in other arrangements, for example, as inserted into an electronic device, similar for example to how a memory card might be inserted. All such variations and varying implementations are intended to come within the spirit and scope of the presently disclosed subject matter.

Implantable medical devices have become more widely used, and with significant importance for the patients who receive such devices. For example, artificial cardiac pacemakers have shown noteworthy abilities to control a user's heartbeat using electrical impulses for contracting the heart muscles of people who suffer from sick sinus syndrome or heart block which otherwise causes abnormal heart rate, and may result in symptoms including syncope, angina, dizziness, and even heart failure or heart attack. However, due to the limited lifespan of a battery, replacement surgery for an artificial pacemaker implanted beneath chest skin should typically be made every 7 to 10 years (or even more frequently, such as every 3 to 6 years, for some devices such as an implantable cardioverter defibrillator (ICD)).

Such battery replacement surgeries can pose a serious risk for patients, especially for elderly persons. For example, adverse complications can arise due to infection or due to bleeding during or after the surgical procedure. Enhancing battery lifetime and increasing the length of time for their replacement cycle can therefore be a highly important issue to assure longer working time of implanted devices such as pacemakers. One highly effective approach to addressing such challenge would be the introduction of self-powered systems, which potentially could provide low maintenance, independent operation, and sustainability for implantable biomedical devices.

It is generally known from the medical field that the frequency spectrum of heart beat oscillations spreads generally from fractions of a hertz to about 50 Hz. However, the amplitude of the 39 Hz frequency component is relatively high and potentially could result in relatively better power production using the presently disclosed technology. Also as known from the biomedical field, the power requirement of pacemakers has been significantly reduced over recent years, to the point that one microwatt is a reasonable upper estimate of the required power for modern pacemakers. Moreover, the size of a typical pacemaker may be about 42 mm×51 mm×6 mm, with the battery typically taking about ⅔ of the size of the pacemaker.

Using the presently disclosed technology and subject matter, it is possible to introduce an AEMM based energy harvester which can be placed inside a pacemaker to harvest sufficient energy for powering such pacemaker. As shown by the presently disclosed technology, a presently disclosed AEMM or unit cell embodiment is capable of harvesting energy at relatively low frequency levels. Further, such harvesting frequency can be decreased down to very low frequencies simply by changing material properties or geometric configurations. For example, as shown above per the Table of FIG. 18 and its related discussion in conjunction with the exemplary embodiment of FIG. 17, energy for powering low power electronics can be scavenged at ~34 Hz using an AEMM cell of diameter 16 mm. Therefore, it will be understood from the complete disclosure herewith that the geometric configuration of an AEMM or unit cell embodiment in accordance with the present disclosure may be created which can scavenge energy at ~39 Hz. In other words, an energy harvestable frequency of about 39 Hz may be practiced with a particular embodiment of the presently disclosed technology.

Figure 20:
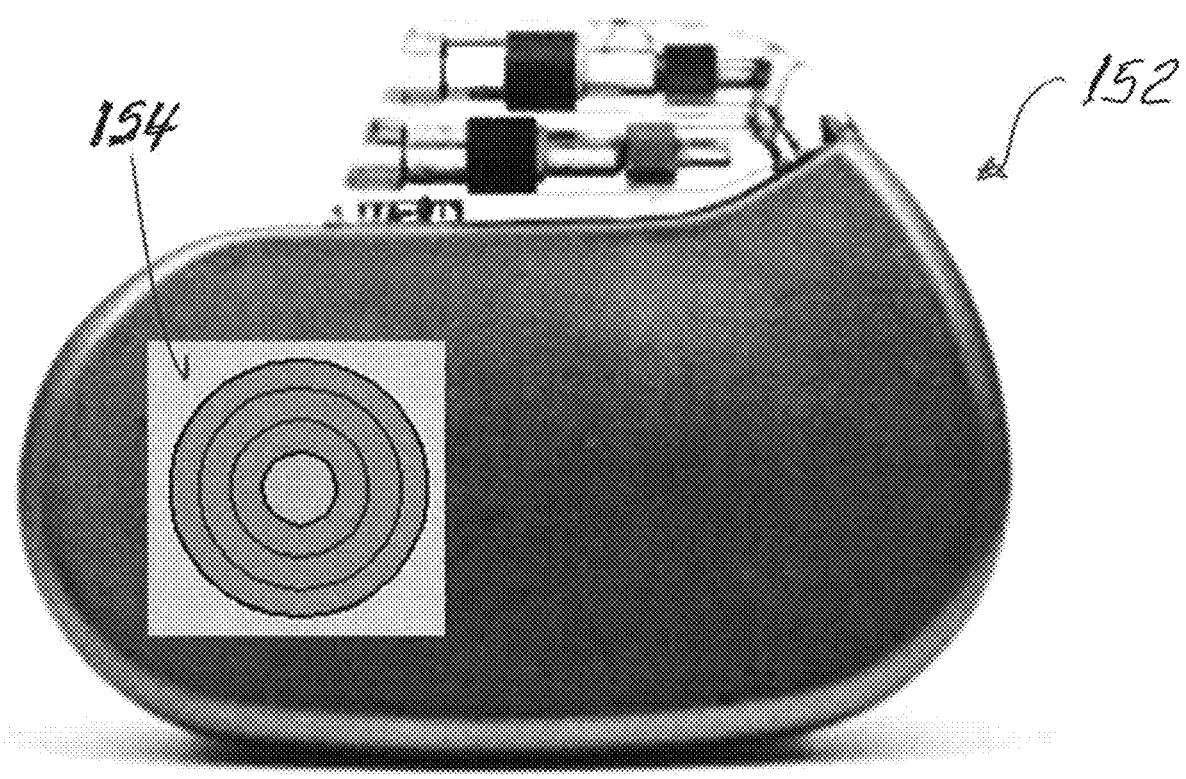
FIG. 20 represents the combination of a pacemaker with a unit cell or AEMM structure in accordance with the presently disclosed subject matter.

FIG. 20 represents an exemplary pacemaker generally 152 which is combined with an AEMM or unit cell harvester generally 154. As noted above, while various focus frequencies may be practiced, such harvester 154 may preferably in some embodiments be designed with a diameter between 16 and 12 mm so that it has a resulting energy harvestable frequency of about 39 Hz. Therefore, the resulting size of an AEMM or unit cell harvester designed for use with a pacemaker can be reduced significantly, to the point of possibly taking up no more than about ⅓ of the size of the regular pacemaker. Such an arrangement would compare favorably with a current pacemaker battery, currently taking up ⅔ of the space for the complete pacemaker system.

Also, as shown, many implementations of the presently disclosed subject matter can be practiced with relatively smaller size that will not interfere with any other processes that it will be around. Specifically, because of its relatively small size, it's easy to be repeated as multiple AEMM structures or unit cells, even if with different designs, and maneuvered into existing installations, or for its location to be changed as desired or required.

While the presently disclosed subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the presently disclosed subject matter is by way of example rather than by way of limitation, and the subject disclosure does not preclude inclusion of such modifications, variations and/or additions to the presently disclosed subject matter as would be readily apparent to one of ordinary skill in the art.

What is claimed is:

1. An energy harvesting apparatus for harvesting of energy from ambient sound sources in a given environment, so that said apparatus is capable of providing electrical energy to a load, said apparatus comprising:
    an acousto-elastic metamaterial unit cell having a matrix which receives a core mass resonator for movement in said unit cell in response to ambient sound in the environment of said unit cell; and
    at least one piezoelectric member embedded in said unit cell, for outputting electrical energy in response to strain created in said unit cell by movement of said resonator in said unit cell;
    wherein said apparatus is tuned for harvesting energy in at least two modes, for optimization of electrical energy generation.

2. Apparatus as in claim 1, wherein said at least two modes comprise at least two respective local resonance modes of said unit cell.

3. Apparatus as in claim 1, wherein said at least two modes comprise at least two piezoelectric wafers respectively embedded in said unit cell, for respectively outputting electrical energy in response to strain created by movement of said resonator in said unit cell.

4. Apparatus as in claim 3, wherein said wafers are embedded in said unit cell in predetermined locations based on the desired axes of vibration for harvesting energy from said unit cell.

5. Apparatus as in claim 1, wherein said piezoelectric member comprises at least one lead zirconate titanate ("PZT") wafer.

6. Apparatus as in claim 1, wherein:
said unit cell further includes a relatively stiff frame enclosing said unit cell matrix;
said unit cell matrix is relatively soft; and
said unit cell core mass resonator is relatively heavy.

7. Apparatus as in claim 6, wherein said unit cell frame comprises aluminum, said unit cell matrix comprises rubber, and said unit cell core mass resonator comprises lead.

8. Apparatus as in claim 1, wherein:
said unit cell matrix comprises a flexible membrane; and
said piezoelectric member comprises a piezoelectric polymer.

9. Apparatus as in claim 8, wherein:
said unit cell matrix comprises a relatively thin section of silicon;
said unit cell core mass resonator comprises steel; and
said piezoelectric polymer comprises polyvinylidene fluoride (PVDF).

10. Apparatus as in claim 8, wherein:
said flexible membrane is attached to a surface of an associated electronic device; and
said piezoelectric member electrical energy output is configured for at least one of powering and charging such electronic device.

11. Apparatus as in claim 10, wherein such associated electronic device comprises an implantable medical device.

12. Apparatus as in claim 11, wherein:
said implantable medical device comprises a pacemaker; and
said apparatus is tuned for having at least one local resonance mode of said unit cell resulting in an energy harvestable frequency of about 39 Hz.

13. Apparatus as in claim 8, wherein said flexible membrane is attached to a plate of a mobile associated electronic device.

14. Apparatus as in claim 13, further including:
a plurality of said acousto-elastic metamaterial unit cells, each respectively having a matrix which receives a core mass resonator for movement in each of said unit cells in response to ambient sound in the environment of said unit cells; and with at least one piezoelectric member embedded in each of said unit cells, for outputting electrical energy in response to strain created in said unit cells by movement of said resonators in said unit cells; and
wherein said piezoelectric members having respective electrical energy outputs configured for at least one of powering and charging such mobile associated electronic device.

15. Apparatus as in claim 14, wherein said plurality of said acousto-elastic metamaterial unit cells comprise generally circular unit cells having respective diameters in a range in respective increments.

16. Apparatus as in claim 1, wherein said apparatus is tuned for harvesting energy from relatively low frequency ambient sound sources.

17. Apparatus as in claim 1, wherein said at least two modes comprise at least three respective piezoelectric wafers respectively embedded at different locations in said unit cell, for respectively outputting electrical energy in response to strains created by vibrations relative respectively to the x-, y- and z-directions of said resonator in said unit cell.

18. Apparatus as in claim 1, wherein
said unit cell further includes a relatively stiff frame having a cavity wall enclosing said unit cell matrix;
said at least one piezoelectric member comprises a piezoelectric wafer selectively embedded in a selected mode Q in said unit cell, for outputting electrical energy in response to strain created in said unit cell by movement of said resonator in said unit cell; and
the distance between the outside diameter of said core mass resonator and said cavity wall is about 3.5 times the distance of the wafer from the outside diameter of said core mass resonator.

19. Apparatus as in claim 1, wherein:
said unit cell further includes a relatively stiff frame enclosing said unit cell matrix;
said apparatus further includes a plurality of said acousto-elastic metamaterial unit cells, having at least one piezoelectric member embedded in each of said unit cells, for outputting electrical energy in response to strain created in said unit cells by movement of said resonators in said unit cells; and
said plurality of unit cells are collectively arranged in a sound barrier for reducing ambient noise from ambient sound sources in a given environment while also collectively electrically connected for outputting electrical energy from said barrier for being stored in an energy storage mechanism or concurrently used as harvested energy output from said barrier.

20. Methodology for harvesting of energy from ambient sound sources in a given environment, for providing electrical energy to a load, such methodology comprising:
providing an acousto-elastic metamaterial unit cell having a matrix which receives a core mass resonator for movement in such unit cell in response to ambient sound in the environment of such unit cell;
embedding at least one piezoelectric member in such unit cell, for outputting electrical energy in response to strain created in such unit cell by movement of such resonator in such unit cell; and
tuning the unit cell and piezoelectric member for harvesting energy in at least two modes, for optimization of electrical energy generation.

21. Methodology as in claim 20, wherein such tuning includes configuring such unit cell for at least two respective local resonance modes of performance.

22. Methodology as in claim 20, wherein such tuning includes providing at least two piezoelectric wafers respectively embedded in such unit cell, for respectively outputting electrical energy in response to strain created by movement of such resonator in such unit cell.

23. Methodology as in claim 22, further including embedding such wafers in such unit cell in predetermined locations based on the desired axes of vibration for harvesting energy from such unit cell.

24. Methodology as in claim 20, wherein such piezoelectric member comprises at least one lead zirconate titanate ("PZT") wafer.

25. Methodology as in claim 20, further including:
providing such unit cell with a relatively stiff frame enclosing such unit cell matrix; and
wherein such unit cell matrix is relatively soft; and
such unit cell core mass resonator is relatively heavy.

26. Methodology as in claim 25, wherein such unit cell frame comprises aluminum, such unit cell matrix comprises rubber, and such unit cell core mass resonator comprises lead.

27. Methodology as in claim 20, wherein:
such unit cell matrix comprises a flexible membrane; and
such piezoelectric member comprises a piezoelectric polymer.

28. Methodology as in claim 27, wherein:
such unit cell matrix comprises a relatively thin section of silicon;
such unit cell core mass resonator comprises steel; and
such piezoelectric polymer comprises polyvinylidene fluoride (PVDF).

29. Methodology as in claim 27, further including:
attaching such flexible membrane to a surface of an associated electronic device; and
configuring such piezoelectric member electrical energy output for at least one of powering and charging such electronic device.

30. Methodology as in claim 29, wherein such associated electronic device comprises an implantable medical device.

31. Methodology as in claim 30, wherein:
such implantable medical device comprises a pacemaker; and
such unit cell is tuned for having at least one local resonance mode resulting in an energy harvestable frequency of about 39 Hz.

32. Methodology as in claim 27, further including attaching such flexible membrane to a plate of a mobile associated electronic device.

33. Methodology as in claim 32, further including:
providing a plurality of such acousto-elastic metamaterial unit cells, each respectively having a matrix which receives a core mass resonator for movement in each of such unit cells in response to ambient sound in the environment of such unit cells; and with at least one piezoelectric member embedded in each of such unit cells, for outputting electrical energy in response to strain created in such unit cells by movement of such resonators in such unit cells; and
configuring respective electrical energy outputs of such piezoelectric members for at least one of powering and charging such mobile associated electronic device.

34. Methodology as in claim 33, wherein such plurality of such acousto-elastic metamaterial unit cells comprise generally circular unit cells having respective diameters in a range in respective increments.

35. Methodology as in claim 20, wherein such unit cell is tuned for harvesting energy from relatively low frequency ambient sound sources.

36. Methodology as in claim 20, further including providing at least three respective piezoelectric wafers respectively embedded at different locations in such unit cell, for respectively outputting electrical energy in response to strains created by vibrations relative respectively to the x-, y- and z-directions of such resonator in such unit cell.

37. Methodology as in claim 20, further including:
providing such unit cell with a relatively stiff frame having a cavity wall enclosing such unit cell matrix; and
wherein such at least one piezoelectric member comprises a piezoelectric wafer selectively embedded in a selected mode Q in such unit cell, for outputting electrical energy in response to strain created in such unit cell by movement of such resonator in such unit cell; and
the distance between the outside diameter of such core mass resonator and such cavity wall is about 3.5 times the distance of the wafer from the outside diameter of such core mass resonator.

38. Methodology as in claim 20, further including:
providing such unit cell with a relatively stiff frame enclosing such unit cell matrix;
providing a plurality of such acousto-elastic metamaterial unit cells, having at least one piezoelectric member embedded in each of such unit cells, for outputting electrical energy in response to strain created in such unit cells by movement of such resonators in such unit cells; and
collectively arranging such plurality of unit cells in a sound barrier for reducing ambient noise from ambient sound sources in a given environment while also collectively electrically connecting such unit cells for outputting electrical energy from such barrier for being stored in an energy storage mechanism or concurrently used as harvested energy output from such barrier.

39. Methodology for harvesting of electric potential from ambient low frequency vibrations having multiple acoustic low frequencies, using a smart unit cell metamaterial, for providing electrical energy to an electrical load, such methodology comprising:
providing an energy harvesting unit comprising an acousto-elastic metamaterial unit cell having a matrix which receives a core mass resonator for movement in such unit cell in response to ambient sound in the environment of such unit cell, and having at least one embedded piezoelectric member in such unit cell, for outputting electrical energy in response to strain created in such unit cell by movement of such resonator in such unit cell;
providing a plurality of such energy harvesting units together in an environment having ambient low frequency vibrations; and
electrically connecting such plurality of energy harvesting units, for providing electrical energy therefrom for one of charging or driving a load.

40. Methodology as in claim 39, further including:
providing each of such energy harvesting units with respective frames surrounding their respective matrices; and
supporting such plurality of such energy harvesting units in a barrier wall so that such wall functions both for noise control and energy harvesting.

41. Methodology as in claim 39, further including:
providing each of such energy harvesting units with planar cell structures; and
supporting such plurality of such energy harvesting units on a plate of an associated electronic device so that such plurality of energy harvesting units provide electrical energy therefrom for one of charging or driving such associated electronic device.

42. Methodology as in claim 39, wherein at least some of such plurality of such energy harvesting units include respective, different structures or materials designed for having different energy harvestable frequencies from at least one other of such energy harvesting units having different structures or materials therefrom.

* * * * *